US011718298B2

(12) United States Patent
Gupta et al.

(10) Patent No.: US 11,718,298 B2
(45) Date of Patent: Aug. 8, 2023

(54) METHODS AND SYSTEMS FOR COORDINATING PREDICTIVE CRUISE CONTROL, ENGINE-OFF COASTING, AND HYBRID POWER SPLIT

(71) Applicant: Cummins Inc., Columbus, IN (US)

(72) Inventors: Rohinish Gupta, Columbus, IN (US); Jonathan A. Dickson, Columbus, IN (US); Kenneth M. Follen, Greenwood, IN (US); Apurva Arvind Chunodkar, Greenwood, IN (US); Arun Prakash Thunga Gopal, Columbus, IN (US); Manik Narula, Columbus, IN (US)

(73) Assignee: Cummins Inc., Columbus, IN (US)

( * ) Notice: Subject to any disclaimer, the term of this patent is extended or adjusted under 35 U.S.C. 154(b) by 171 days.

(21) Appl. No.: 17/075,826

(22) Filed: Oct. 21, 2020

(65) Prior Publication Data
US 2022/0118980 A1    Apr. 21, 2022

(51) Int. Cl.
| | |
|---|---|
| *B60W 30/18* | (2012.01) |
| *B60W 20/12* | (2016.01) |
| *B60W 20/15* | (2016.01) |
| *B60W 40/105* | (2012.01) |
| *B60W 10/08* | (2006.01) |
| *B60W 40/06* | (2012.01) |

(52) U.S. Cl.
CPC ...... *B60W 30/18127* (2013.01); *B60W 10/08* (2013.01); *B60W 20/12* (2016.01); *B60W 20/15* (2016.01); *B60W 40/06* (2013.01); *B60W 40/105* (2013.01); *B60W 2510/0208* (2013.01); *B60W 2510/244* (2013.01); *B60W 2556/45* (2020.02)

(58) Field of Classification Search
CPC .......... B60W 30/18127; B60W 10/08; B60W 20/12; B60W 20/15; B60W 40/06; B60W 40/105; B60W 2510/0208; B60W 2510/244; B60W 2556/45
See application file for complete search history.

(56) References Cited

U.S. PATENT DOCUMENTS

| | | | |
|---|---|---|---|
| 6,338,391 B1 * | 1/2002 | Severinsky | ........... B60W 10/08 180/65.23 |
| 7,991,519 B2 | 8/2011 | Snyder | |

(Continued)

FOREIGN PATENT DOCUMENTS

KR    20190051584 A    5/2019

*Primary Examiner* — Jeff A Burke
*Assistant Examiner* — Kyle T Johnson
(74) *Attorney, Agent, or Firm* — Faegre Drinker Biddle & Reath LLP

(57) ABSTRACT

The enclosed disclosure relates to hybrid vehicles and systems with an engine, a drivetrain with a clutch and a transmission, an electric machine, and a controller. The controller receives lookahead information within a lookahead window and present state information of the hybrid vehicle. The controller determines a predicted coasting opportunity exceeding a predetermined threshold within the lookahead window and determines a cruise control reference speed, a power split between the engine and the electric machine, and a timing of enabling engine-off coasting during the coasting opportunity. The controller deactivates the engine and disengages the clutch at a start of the coasting opportunity when the engine-off coasting is enabled.

26 Claims, 13 Drawing Sheets

(56) References Cited

U.S. PATENT DOCUMENTS

| | | |
|---|---|---|
| 9,440,654 B2 | 9/2016 | Atluri et al. |
| 9,751,521 B2 | 9/2017 | Schwartz et al. |
| 9,981,560 B2 | 5/2018 | Zinner |
| 10,393,195 B2 | 8/2019 | Follen et al. |
| 2008/0287255 A1 | 11/2008 | Snyder |
| 2011/0174559 A1* | 7/2011 | Saito .................. B60W 10/08 903/902 |
| 2012/0031692 A1* | 2/2012 | Koike ................. B60T 13/586 903/902 |
| 2012/0232730 A1* | 9/2012 | Sujan ............... B60W 50/0097 180/65.265 |
| 2015/0258984 A1* | 9/2015 | Atluri ............... B60W 30/188 180/65.265 |
| 2015/0275787 A1* | 10/2015 | Dufford ............. B60W 10/08 701/112 |
| 2015/0314775 A1* | 11/2015 | Dextreit ............. B60W 20/11 180/65.265 |
| 2017/0137029 A1* | 5/2017 | Dynes ............ B60W 30/18072 |
| 2017/0144650 A1* | 5/2017 | Nagami .................. B60K 6/22 |
| 2017/0159593 A1* | 6/2017 | Roos .................... B60W 10/06 |
| 2018/0134270 A1 | 5/2018 | Sujan et al. |
| 2019/0039601 A1 | 2/2019 | Hawley |
| 2019/0100204 A1* | 4/2019 | Plianos ........... B60W 30/18127 |
| 2019/0100208 A1* | 4/2019 | Plianos .................. F02D 29/02 |
| 2019/0217724 A1 | 7/2019 | Erb et al. |
| 2019/0389450 A1 | 12/2019 | Sujan et al. |
| 2022/0118980 A1* | 4/2022 | Gupta ............ B60W 30/18127 |

\* cited by examiner

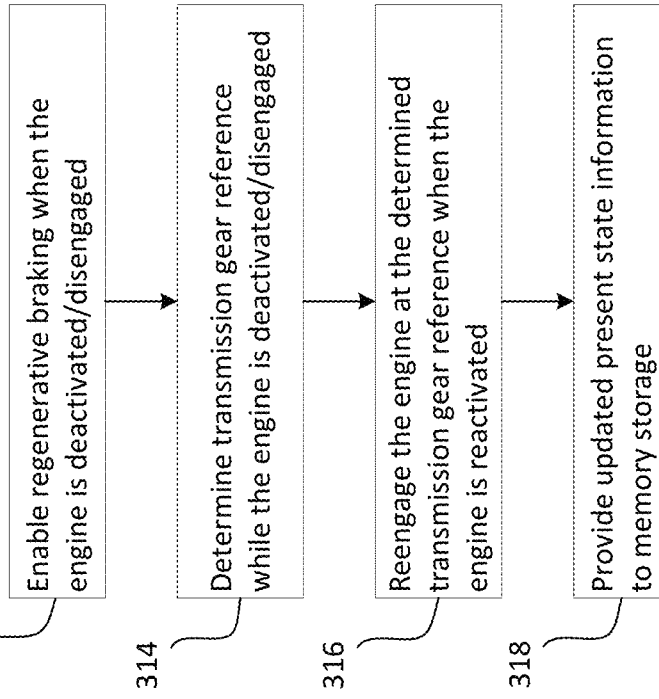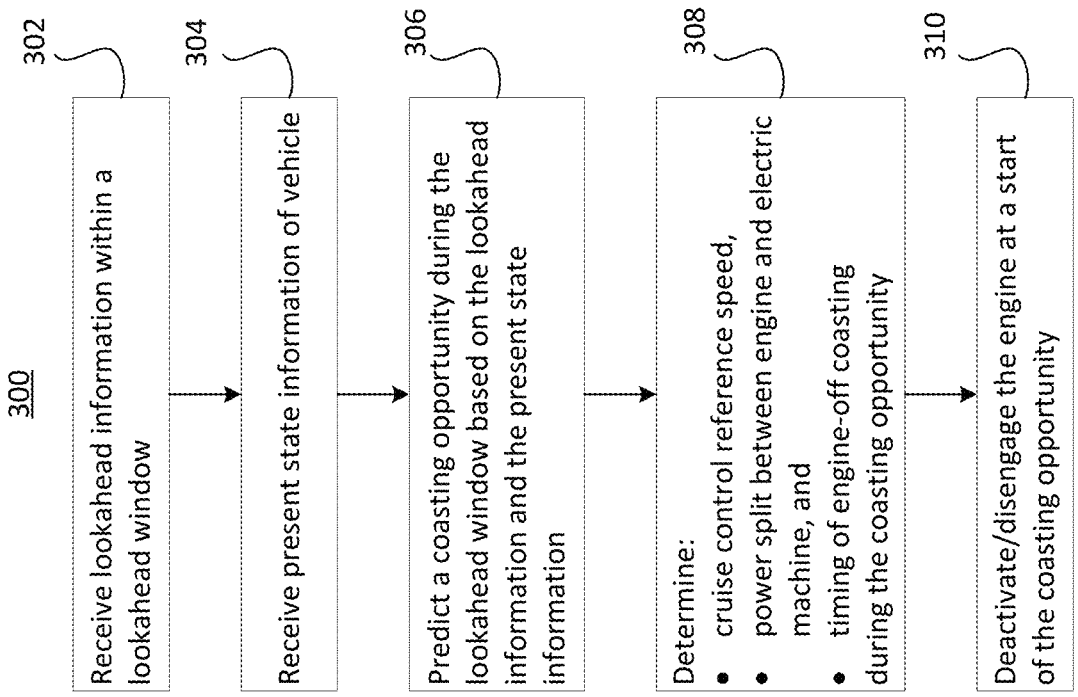

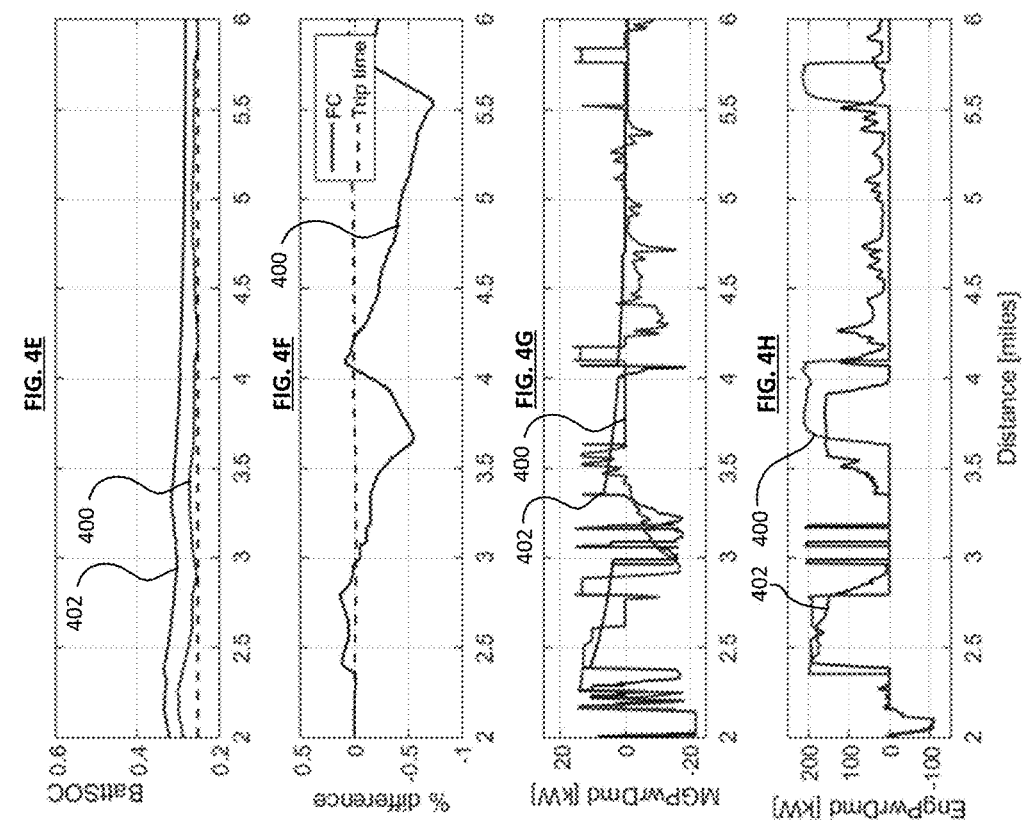
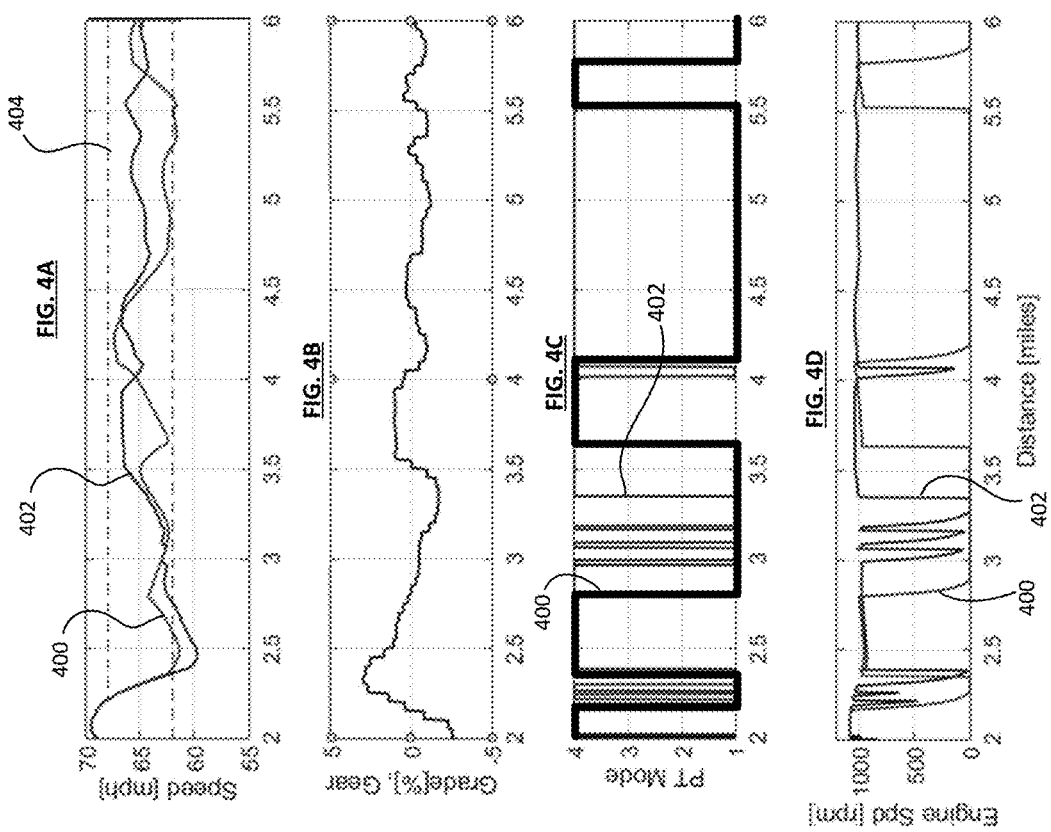

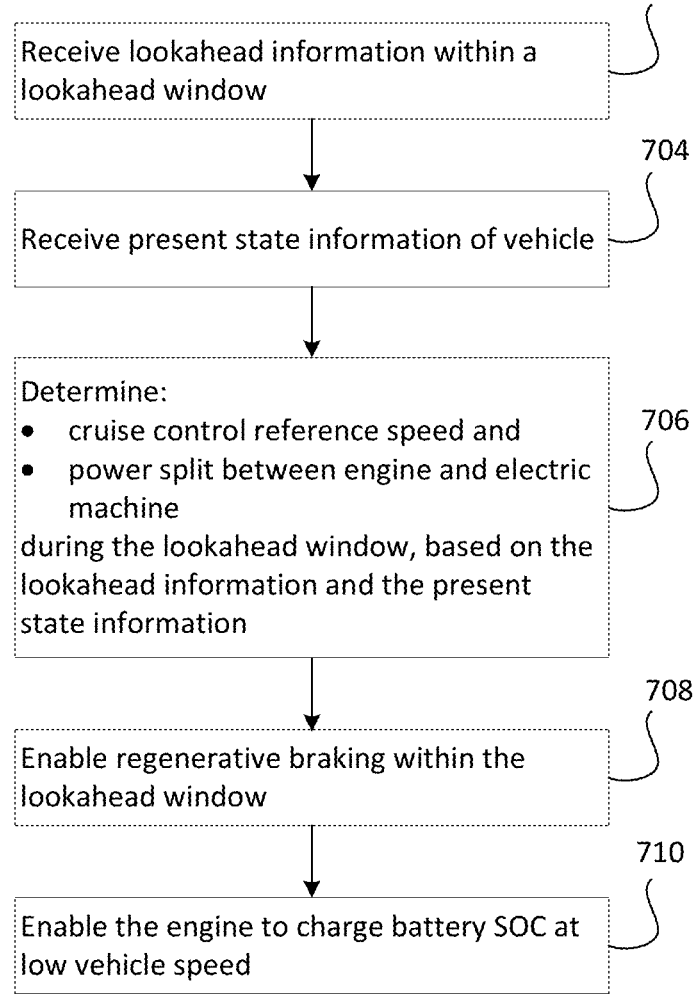

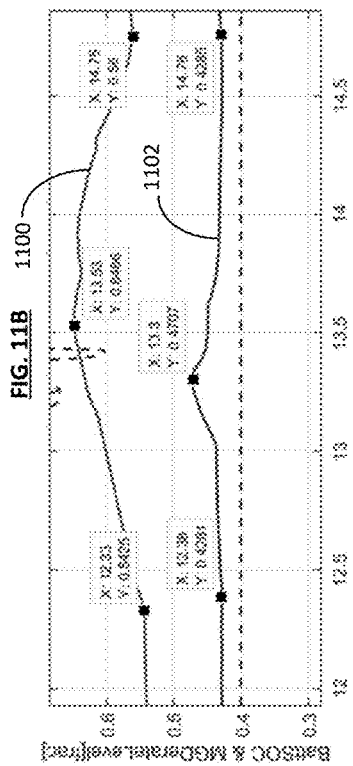
FIG. 11B
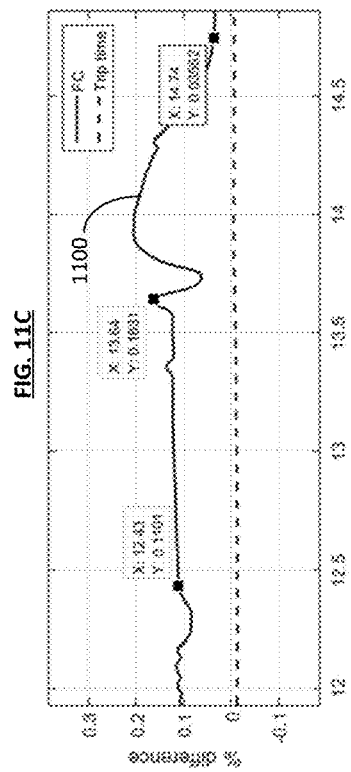
FIG. 11C
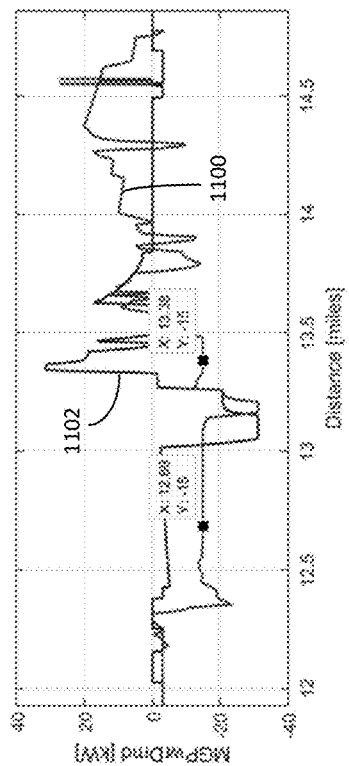
FIG. 11D
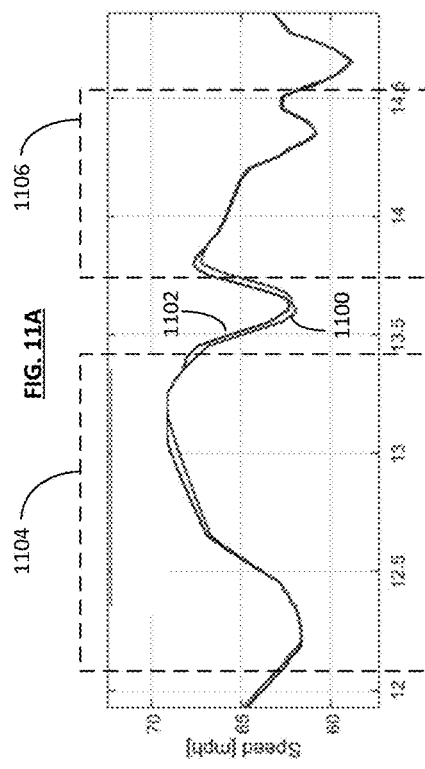
FIG. 11A
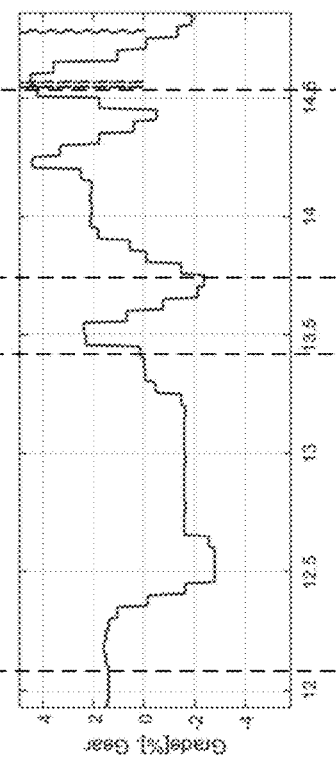
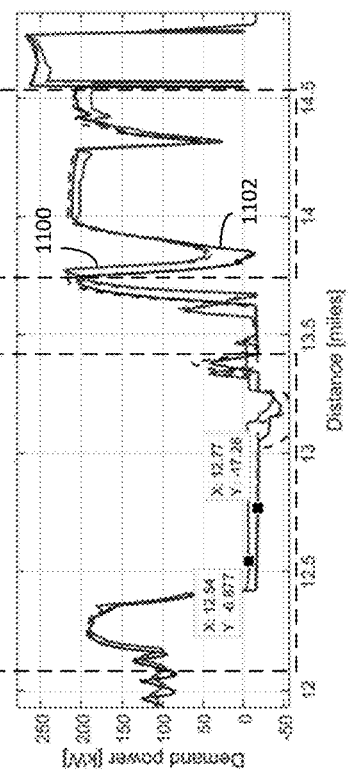

METHODS AND SYSTEMS FOR COORDINATING PREDICTIVE CRUISE CONTROL, ENGINE-OFF COASTING, AND HYBRID POWER SPLIT

GOVERNMENT SUPPORT CLAUSE

This invention was made with Government support under DE-EE0007761 awarded by the Department of Energy. The Government has certain rights in this invention.

FIELD OF THE DISCLOSURE

The present disclosure relates generally to hybrid engine systems and more specifically to engine, transmission, and motor control during vehicle operation.

BACKGROUND OF THE DISCLOSURE

Numerous methods and systems exist for reducing the amount of power used by a vehicle during operations. One such system is cruise control which automatically controls the speed of a motor vehicle. The system is a servomechanism that takes over the throttle of the vehicle to maintain a steady speed as set by the driver. Especially in an open road such as a highway with light traffic, driving at a steady predetermined speed improves the fuel efficiency of the vehicle. Another method which can be used is a coasting state. While coasting, the accelerator pedal of the vehicle is disengaged (i.e., no depression) or the engine is disengaged from the drivetrain, and the vehicle moves based on its momentum. Due to friction, loss of momentum, and wind resistance, the coasting vehicle eventually comes to a stop. In the coasting state, the vehicle moves using a relatively low amount of power as compared to a motoring state of the vehicle, thus conserving fuel for the vehicle. When the situation changes on the road, however, such methods and systems will offer less fuel efficiency. Accordingly, further contributions are needed in this area of technology.

SUMMARY OF THE DISCLOSURE

According to the present disclosure, a hybrid vehicle includes an engine, a drivetrain mechanically coupled with the engine, comprising a clutch and a transmission, an electric machine mechanically coupled with the transmission, and a controller operatively coupled with the engine, the drivetrain, and the electric machine. The controller can receive lookahead information within a lookahead window, receive present state information of the hybrid vehicle, determine, during the lookahead window based on the lookahead information and the present state information, a predicted coasting opportunity exceeding a predetermined threshold, determine a cruise control reference speed, a power split between the engine and the electric machine, and a timing of enabling engine-off coasting during the predicted coasting opportunity, and deactivate the engine and disengage the clutch at a start of the predicted coasting opportunity in response to enabling the engine-off coasting.

In some examples, the controller can enable regenerative braking when the engine is deactivated. In some examples, the controller can determine a transmission gear reference while the engine is deactivated and reengage the engine at the determined transmission gear reference when the engine is reactivated. In some examples, the controller can provide updated present state information to a memory storage device. In some examples, the lookahead information includes at least one of: road grade and terrain information, speed limits, traffic information, stop signs, traffic signals, or weather conditions. In some examples, the predetermined threshold is defined by an extended distance of at least 0.3 mile during which the engine can be deactivated. In some examples, the extended distance is at least 0.5 mile or at least 1 mile. In some examples, the lookahead information is provided from a remote device wirelessly coupled with the controller via a cloud network infrastructure.

According to the present disclosure, a hybrid vehicle, having an engine, a drivetrain mechanically coupled with the engine, comprising a clutch and a transmission, and an electric machine mechanically coupled with the transmission, also has a controller operatively coupled with the engine, the drivetrain, and the electric machine. The controller can receive lookahead information within a lookahead window, receive present state information of the hybrid vehicle, determine a cruise control reference speed and a power split between the engine and the electric machine during the lookahead window based on the lookahead information and the present state information, and enable motor propulsion and regenerative braking within the lookahead window.

In some examples, the regenerative braking is enabled at a location where a predicted speed increase above an upper speed threshold begins based on the lookahead information. In some examples, the motor propulsion is enabled at a location where a predicted speed decrease below a lower speed threshold begins based on the lookahead information. In some examples, the controller is further configured to enable the engine to charge an energy storage device coupled with the electric machine when speed of the vehicle is below a lower speed threshold. In some examples, the controller determines the cruise control reference speed and the power split to conserve a state of charge (SOC) of an energy storage device coupled with the electric machine until a power demand for the hybrid vehicle exceeds a power demand threshold. In some examples, the lookahead information includes at least one of: road grade and terrain information, speed limits, traffic information, stop signs, traffic signals, or weather conditions. In some examples, the lookahead information is provided from a remote device wirelessly coupled with the controller via a cloud network infrastructure.

Also disclosed herein are methods of controlling a hybrid vehicle. The method includes receiving, by a control module, lookahead information within a lookahead window, receiving, by the control module, present state information of the hybrid vehicle, determining, by the control module during the lookahead window based on the lookahead information and the present state information, a predicted coasting opportunity exceeding a predetermined threshold, determining, by the control module, a cruise control reference speed, a power split between the engine and the electric machine, and a timing of enabling engine-off coasting during the predicted coasting opportunity, and deactivating the engine and disengaging the clutch at a start of the predicted coasting opportunity in response to enabling the engine-off coasting.

In some examples, the method includes enabling regenerative braking when the engine is deactivated. In some examples, the method includes enabling motor propulsion at a location where a predicted speed decrease below a lower speed threshold begins based on the lookahead information. In some examples, the method includes determining a transmission gear reference while the engine is deactivated and reengaging the engine at the determined transmission gear reference when the engine is reactivated. In some examples, the lookahead information includes at least one of: road grade and terrain information, speed limits, traffic information, stop signs, traffic signals, or weather conditions. In some examples, the predetermined threshold is defined by an extended distance of at least 0.3 mile during which the engine can be deactivated.

According to the present disclosure, a method of controlling a hybrid vehicle includes receiving, by the control module, present state information of the hybrid vehicle, determining, by the control module, a cruise control reference speed and a power split between the engine and the electric machine during the lookahead window based on the lookahead information and the present state information, and enabling, by the control module, motor propulsion and regenerative braking within the lookahead window based on the cruise control reference speed and the power split. In some examples, the motor propulsion is enabled at a location where a predicted speed decrease below a lower speed threshold begins based on the lookahead information. In some examples, the regenerative braking is enabled at a location where a predicted speed increase above an upper speed threshold begins based on the lookahead information.

In some examples, the method further includes enabling, by the control module, the engine to charge an energy storage device coupled with the electric machine when speed of the vehicle is below a lower speed threshold. In some examples, the method also includes determining, by the control module, the cruise control reference speed and the power split to conserve a state of charge (SOC) of an energy storage device coupled with the electric machine until a power demand for the hybrid vehicle exceeds a power demand threshold. In some examples, the lookahead information includes at least one of: road grade and terrain information, speed limits, traffic information, stop signs, traffic signals, or weather conditions.

Also disclosed herein are controllers or control units for a hybrid vehicle. The control unit can receive lookahead information within a lookahead window, receive present state information of the hybrid vehicle, determine a predicted coasting opportunity during the lookahead window based on the lookahead information and the present state information, and determine a cruise control reference speed, a power split between the engine and the electric machine, and a timing of enabling engine-off coasting during the predicted coasting opportunity. Alternatively, the control unit can receive lookahead information within a lookahead window, receive present state information of the hybrid vehicle, and determine a cruise control reference speed and a power split between the engine and the electric machine during the lookahead window based on the lookahead information and the present state information.

Additional features and advantages of the present disclosure will become apparent to those skilled in the art upon consideration of the following detailed description of the illustrative embodiment exemplifying the best mode of carrying out the disclosure as presently perceived.

BRIEF DESCRIPTION OF THE DRAWINGS

The detailed description of drawings particularly refers to the accompanying figures in which:

FIGS. 3A and 3B are flowcharts of a method of operating a vehicle implementing the predictive control system according to an embodiment disclosed herein;

FIGS. 4A through 4H show a series of graphs comparing the results of a coordinated predictive control process according to an embodiment disclosed herein with those of a predictive cruise control process as known in the art;

FIG. 7 is a flowchart of a method of operating a vehicle implementing the predictive control system according to an embodiment disclosed herein;

FIGS. 11A through 11D show a series of graphs comparing the results of a coordinated predictive control process according to an embodiment disclosed herein with those of a predictive cruise control process as known in the art;

DETAILED DESCRIPTION

The embodiments of the disclosure described herein are not intended to be exhaustive or to limit the disclosure to the precise forms disclosed. Rather, the embodiments selected for description have been chosen to enable one skilled in the art to practice the disclosure.

Figure 1:
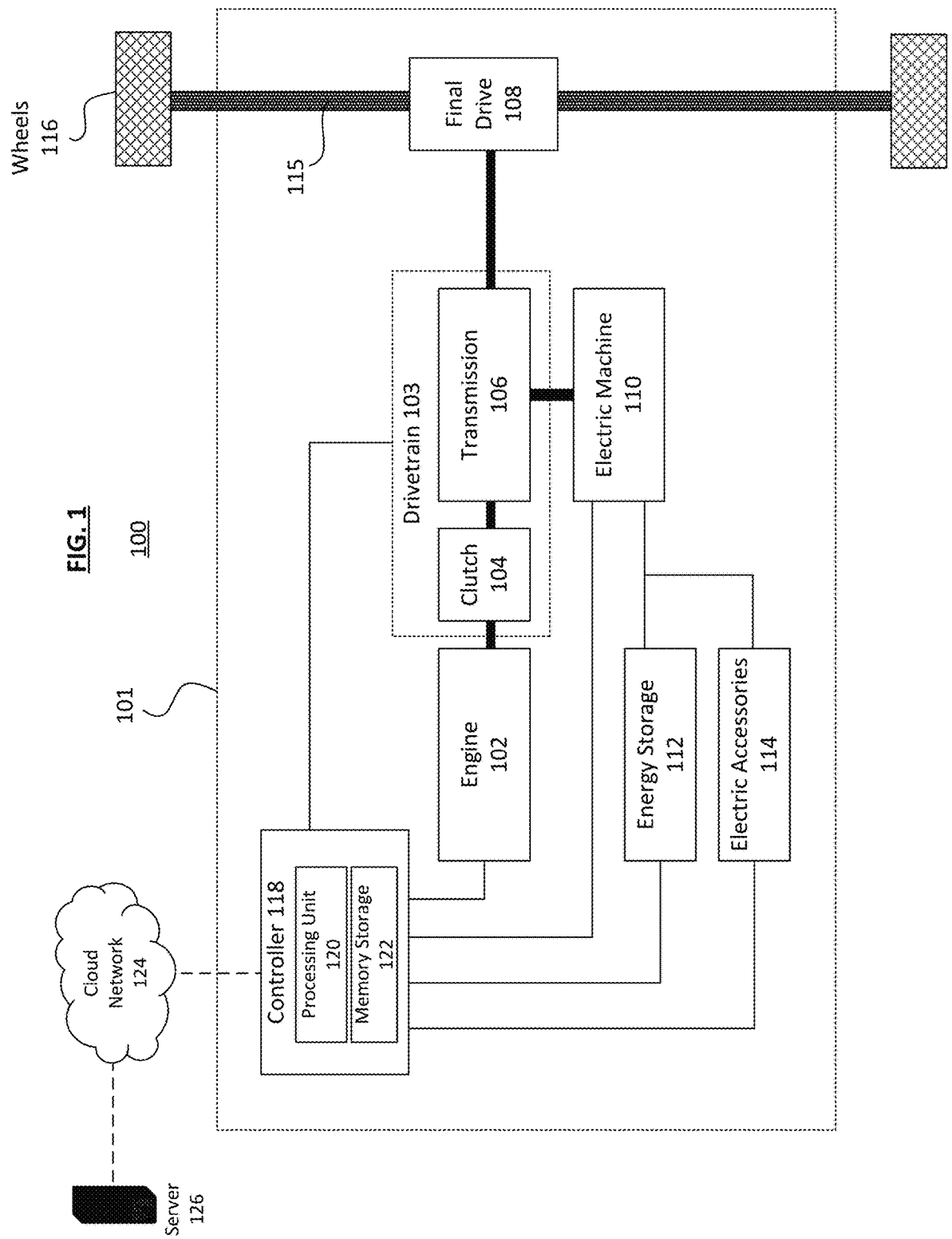
FIG. 1 is a schematic diagram of a parallel hybrid vehicle system which implements a predictive control system according to an embodiment disclosed herein.

Referring to FIG. 1, a hybrid vehicle control system 100 is disclosed as having a hybrid vehicle 101 which includes, within its chassis, an engine 102 such as internal combustion engine (ICE), a drivetrain 103 which includes a transmission 106 and a clutch 104 that mechanically couples the engine 102 to the transmission 106, and a final drive 108 which contains the differential that is mechanically coupled with a drive shaft 115 connecting two wheels 116 together. Additionally, an electric machine 110 is mechanically coupled with the transmission 106 in a parallel configuration with respect to the engine 102 such that either the engine 102 or the electric machine 110 may provide mechanical power to the transmission 106 at any time. In some examples, the electric machine 110 is a motor or a motor-generator. The engine 102, the drivetrain 103, and the electric machine 110 are herein collectively referred to as a "powertrain."

The electric machine 110 is electrically coupled with at least one energy storage device 112 and also to electric accessories 114 in some examples. The energy storage device 112 in some examples includes, but is not limited to, batteries such as lithium-ion, nickel-metal hydride, lead-acid, and ultracapacitors, among any other suitable types of energy storage devices. The electric accessories 114 include but are not limited to alternators, water pumps, power steering pump, air conditioner compressor, electric fans, etc., and these accessories 114 are powered using the energy stored in the energy storage device 112. In FIG. 1, the thick lines represent mechanical coupling, whereas the thin lines represent electrical coupling, for example via wires or buses.

The hybrid vehicle 101 also includes a controller 118, which includes a processing unit 120 and a memory storage device 122. The processing unit 120 may be any suitable processor such as a central processing unit (CPU), state machines, system-on-chip (SoC), etc. The memory storage device 122 may be any suitable memory such as random access memory (RAM), read-only memory (ROM), flash memory, etc. The controller 118 is electrically coupled to the engine 102, drivetrain 103, electric machine 110, energy storage device 112, and electric accessories 114 such that the controller 118 may detect any input from these components as well as send operation signals to these components.

In some examples, the components that are electrically coupled with the controller 118 have one or more sensors (not shown) coupled thereto that take measurements which indicate the present status of the component, such as a state of charge (SOC) for the energy storage device 112, the temperature of the engine 102 and/or its aftertreatment system (not shown), the on/off status of the clutch 104, among others. In some examples, such data is stored in the memory storage device 122 of the controller 118 such that the controller 118 may use the stored data at any time without having to take new measurement when needed. In some examples, the data in the memory storage device 122 is updated frequently at a constant rate, i.e. new measurements are taken at predetermined intervals, such that "freshness" of the data is maintained. The controller 118 in some examples has instructions, e.g. computing algorithms, stored in the memory storage device 122 which the processing unit 120 uses to perform the vehicle control process as disclosed herein.

The controller 118 is operative to optimize predictive cruise control, predictive engine-off coasting, and predictive power split between the engine 102 and the electric machine 110 for a variety of objectives, including but not limited to fuel economy, performance, emissions, and/or component life. The controller 118 has the ability to disengage the engine 102 from a driveline, which includes the drivetrain 103 and the final drive 108, by disengaging the clutch 104 while the electric machine 110 is kept engaged with the driveline.

The predictive cruise control may include methods of previewing the road ahead and modifying both the fueling rate and speed limit, to take advantage of vehicle momentum to improve fuel efficiency, as used in Advanced Electric Powertrain Technology (ADEPT™), for example, or any other technology known in the art. The controller 118 may implement the Controller Area Network (CAN) bus standard such that the controller 118 comprises a plurality of microcontrollers that communicate with each other's applications without a host computer.

The controller 118 is configured to receive lookahead environment information from a remote device such as a remote server 126 through a network such as a cloud network 124 or the Internet. The lookahead information is received wirelessly, as indicated by the broken lines in FIG. 1, through the telematics (not shown) of the vehicle 101. In some examples, the lookahead information is stored in the memory storage device 122 along with the present status of the components as measured by the sensors. In some examples, the lookahead information includes but is not limited to one or more of: road grade and terrain information, speed limits, traffic information, stop signs, traffic signals, and/or weather conditions, etc.

Figure 2:
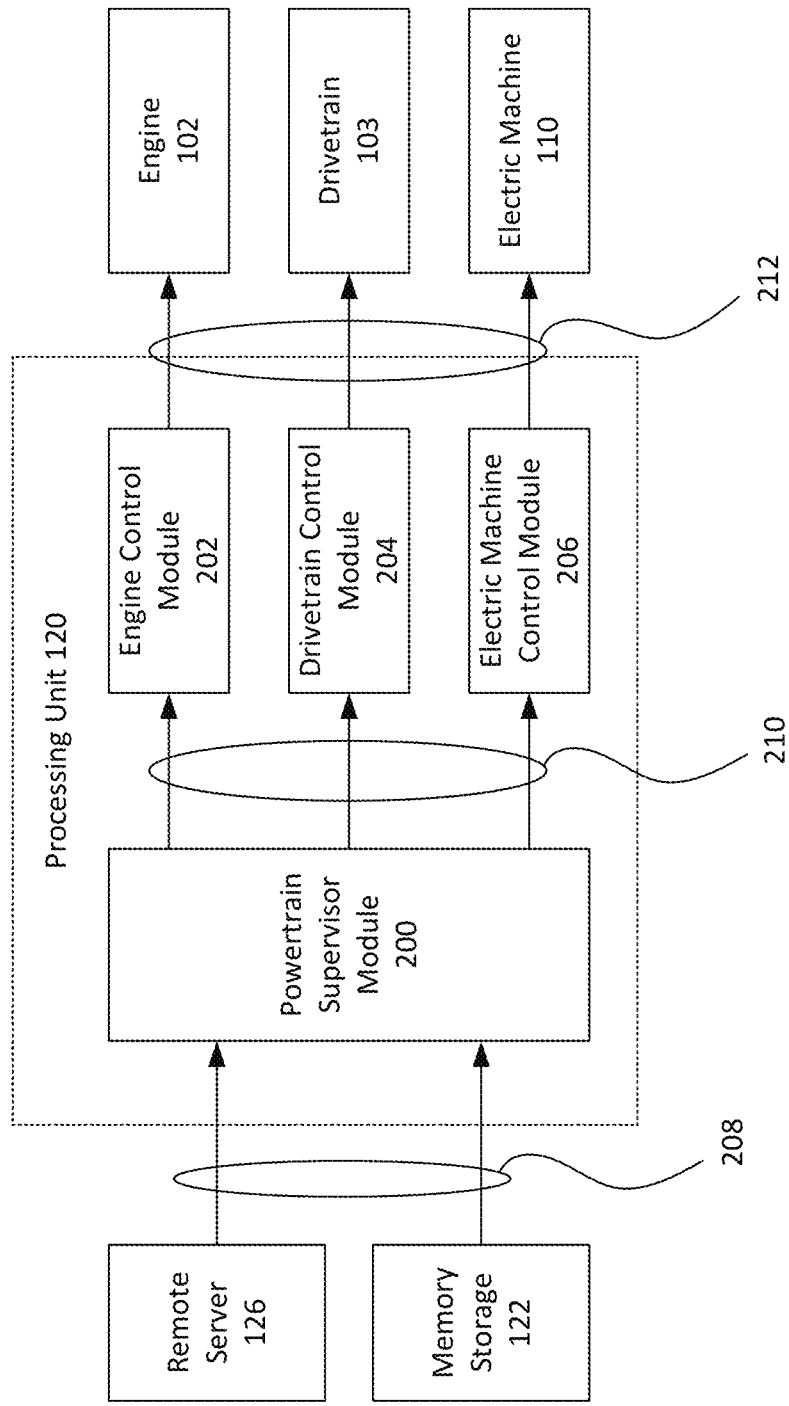
FIG. 2 is a schematic diagram of the predictive control system of FIG. 1 according to an embodiment disclosed herein.

FIG. 2 shows the flow of data and signals to and from the processing unit 120 of the controller 118. The processing unit 120 includes powertrain supervisor module 200 which receives information (referred to herein as "input data" 208) from the local memory storage device 122 and the remote server 126 with regards to the lookahead information and the present state of the vehicle. Engine control module 202 (or an engine control unit) receives information related to the operation of the engine from the powertrain supervisor module 200 and determines the operation signal to transmit to the engine 102. Drivetrain control module 204 (which includes a clutch control unit and a transmission control unit) receives information related to the operation of the drivetrain 103 which includes the clutch 104 and the transmission 106, and determines the operation signal to transmit to the drivetrain 103. Electric machine control module 206 (or a motor control unit) receives information related to the operation of the electric machine 110 and determines the operation signal to transmit to the electric machine 110. Information, or data, sent from the powertrain supervisor module 200 to the subsequent modules (202, 204, and 206) is also referred to herein as "output data" 210. The signals transmitted from the modules 202, 204, and 206 to the subsequent vehicle components (102, 103, and 110) are also referred to herein as "operation signals" 212.

Input data 208 to the powertrain supervisor module 200 is explained herein. In some examples, the information received from the remote server 126 includes lookahead data such as those representing the knowledge of the route and environment of the vehicle 100. The lookahead data includes the route and environmental information within a specific time period in the future, also called "lookahead window." Based on the knowledge of the lookahead window, the powertrain supervisor module 200 is configured to send output data 210 to the subsequent modules.

In some examples, the information received from the memory storage device 122 includes information related to the present vehicle status including but not limited to fuel economy, vehicle performance, vehicle component life, etc., including the knowledge of mission requirements. Furthermore, the memory storage device 122 provides knowledge of the vehicle, such as the amount of power which can be provided by the engine 102 and the electric machine 110 as well as the physical properties such as the weight of the vehicle and the weight of the cargo carried by the vehicle, for example. It is to be understood that, in some examples, all the input data may be provided by the remote server 126 (which is also a type of memory storage device). With these input data, the powertrain supervisor module 200 dynamically optimizes power delivery to the vehicle 100 through enhanced knowledge of the vehicle and the environment. Vehicle may be a passenger car, a truck, a trailer, or any other suitable type of vehicle.

Output data 210 from the powertrain supervisor module 200 is explained herein. In some examples, the power supervisor module 200 determines, based on the input data 208, that the engine 102 may be disconnected or disengaged from the drivetrain 103 to enable engine-off coasting, in which the vehicle moves based on its momentum. In order to do so, the powertrain supervisor module 200 determines the following: an engine-off coast reference information and a cruise reference information to be forwarded to the engine control module 202, and gear-and-clutch reference information to be forwarded to the drivetrain control module 204. The engine-off coast reference information indicates when to turn off the engine 102 during the lookahead window, and the cruise reference information indicates the reference speed at which the vehicle is to be traveling during the lookahead window. The gear-and-clutch reference information indicates when to disengage the clutch 104 to disconnect the engine 102 from the drivetrain 103, as well as which gear should the transmission 106 be in when the engine 102 reengages with the drivetrain 103 after the engine-off coasting ends.

In some examples, the powertrain supervisor module 200 also determines an electric machine power command information which indicates the amount of power to be provided by the electric machine 110 within the lookahead window. Specifically, the electric machine 110 will be relied upon to provide any additional power when the engine 102 is disengaged during the engine-off coasting, so the electric machine power command information instructs when to activate the electric machine 110 to meet any future power demand depending on the lookahead information obtained.

Operation signals 212 are explained herein. The control modules 202, 204, and 206 all receive information from the powertrain supervisor module 200 regarding when and how to operate their respective components. As such, the control modules 202, 204, and 206 provide operation signals to the engine 102, drivetrain 103, and electric machine 110, respectively, at the indicated timing within the lookahead window to achieve the operation status required by the powertrain supervisor module 200.

The functions of the powertrain supervisor module 200 are explained herein. As previously explained, the supervisor module 200 receives lookahead information pertaining to a lookahead window of a predetermined time period (e.g., 10 minutes) or a predetermined distance (e.g., 5 miles). The lookahead information includes, but is not limited to, lookahead road grade (e.g., inclines and declines), speed limit, traffic information (e.g., proximity of the vehicles from each other), and weather (e.g., wind, water, ice, or road blockage due to bad weather). In some examples, the lookahead information includes the speed limits and information regarding emissions requirements such as low- or zero-emission zone information. The lookahead information may come from a combination of proprietary sources (e.g., database or computer system of a private entity) or openly available sources (e.g., publicly available online database such as websites and "apps" on smart devices).

The supervisor module 200 optimizes the powertrain control decisions using one or more of the following procedures. In some examples, the supervisor module 200 queries onboard devices (e.g., local memory storage device) and/or offboard devices (e.g., remote servers or computers) to obtain the lookahead information pertaining to the vehicle's route within a lookahead window. The supervisor module 200 determines the power, velocity, performance, and/or energy requirements within the lookahead window. Then, the supervisor module 200 determines one or more vehicle performance constraints and/or vehicle optimization goals that are either inputted directly by the operator (e.g., manual input via user interface, installed on the vehicle or via the operator's portable device), provided remotely from an external infrastructure (e.g., from the remote server 126), or already stored locally (e.g., within the local memory storage device 122). In some examples, the vehicle optimization goals are either predetermined, set by the operator, or dynamically changed over time during one or more duty cycles and/or missions. The supervisor module 200 also receives information pertaining to the present state of the vehicle, such as engine state information including but not limited to engine aftertreatment operational states (e.g., temperature of the selective catalytic reduction system and effectiveness of the particulate filter, etc.) and engine fueling states.

In some examples, based on the lookahead information and present state information of the vehicle, the supervisor module 200 determines at least one ideal coasting opportunity within the lookahead window, depending on the powertrain capability included in the present state information. The ideal coasting opportunity is defined as an extended distance in which the vehicle is allowed to enable coasting (that is, deactivating the engine). The extended distance may be at least 0.3 mile, at least 0.5 mile, at least 0.7 mile, at least 1 mile, at least 1.2 miles, at least 1.5 miles, at least 2 miles, or any other range of distance therebetween. Therefore, in the ideal coasting opportunity, the engine is prevented from being deactivated for a short distance (such as less than 0.1 mile) before being reactivated immediately afterwards. The powertrain capability includes one or more of: the engine state, the electric machine state and capability, the battery state and SOC, the vehicle's optimization goals and performance constrains, and/or the vehicle's predicted operation when the engine is turned on/off with motor/generator assistance, etc. In some examples, whether to apply the engine-off coasting is determined based on a tradeoff between the vehicle's kinetic energy and electric energy in a way that optimizes both the overall system energy loss (such as engine or service braking modes) and powertrain efficiency, while the vehicle meets the performance constraints.

In some examples, in order to maximize the ideal engine-off coasting opportunities, the supervisor module 200 modulates or controls: (1) a cruise control reference speed (a speed or range of speed at which the vehicle is to be traveling when cruise control is activated), (2) a power split between the engine 102 and the electric machine 110, and (3) an engine on/off state, in addition to whether the engine is engaged or disengaged with the driveline through clutch operation. When the cruise control is disabled, instead of the aforementioned (1) cruise control reference speed, the supervisor module 200 may modulate or control the vehicle's speed limit and/or total power limit for the combination of the power flow from both the engine 102 and the electric machine 110. In some examples, the supervisor module 200 provides the gear reference for the transmission 106 (included in the gear-and-clutch reference information previously mentioned) during the time when the engine is turned off or disengaged, if needed, such that when the engine is turned on again or reengaged, the transmission 106 reengages the clutch 104 in the appropriate gear based on the performance, emissions, and/or fuel economy demands of the vehicle, while minimizing frequent usage of the neutral gear or gear shifts.

In some examples, while the ideal engine-off coasting opportunity is identified and achieved, the powertrain (that is, the engine 102, transmission 104, and electric machine 110) may provide additional proprietary information, such as updated present state information, to the operator and/or the infrastructure (e.g., database or server electrically coupled with the vehicle) regarding the current and aggregated information of the engine state, transmission state, vehicle performance constrains, and optimization objectives. Such proprietary information includes, but are not limited to, a length of engine-off time during the mission or trip taken by the vehicle, relative change(s) in vehicle optimization objectives such as the amount of fuel saved during the mission or trip, and potential change(s) in the optimization objectives when the performance constraints are changed.

FIG. 3A shows a flowchart of a process 300 as disclosed herein, performed by the controller 118, or in some examples more specifically the powertrain supervisor module 200 of the processing unit 120 within the controller 118. In step 302, the controller queries for and receives lookahead information, as previously mentioned, within a lookahead window. In step 304, the controller receives the present state information of the vehicle, also previously mentioned. The controller may receive information from any source including but not limited to local memory storage device, remote memory storage device, or other devices such as portable devices or computers electrically coupled with the vehicle.

In step 306, the controller uses the lookahead information and the present state information to predict a coasting opportunity during the lookahead window. Specifically, the controller may calculate the lookahead power, velocity, energy, or performance requirements. Additionally, the controller may also receive engine and engine-driven accessory information and electric machine, battery, power electronics, and/or electrified accessory information. In some examples, the controller may also determine constraints and optimization objectives in order to determine the coasting opportunity in step 306. There may be one or several coasting opportunities within the lookahead window.

The coasting opportunity is defined as a span of time or distance in which the vehicle can activate the engine-off coasting mode such that the engine is deactivated (turned off) and disengaged (disconnected) from the drivetrain. The engine is allowed to reactivate and reengage with the drivetrain at the end of the coasting opportunity. In some examples, in step 306, there is also an additional step to enable a neutral-coasting mode instead of the engine-off coasting mode when such coasting is desired but the component or system constraints require the engine to remain on. The neutral-coasting mode saves fuel by allowing the engine speeds to drop to idle, but the engine is allowed to remain on unlike the engine-off coasting mode.

In step 308, the controller determines (1) cruise control reference speed, (2) power split between the engine and the electric machine, and (3) timing of the engine-off coasting, which is when the engine is to be deactivated and disengaged, during the predicted coasting opportunity. In step 310, the controller deactivates and disengages the engine at a start of the coasting opportunity. In some examples, the controller commands an inverter of the electric machine to propel or regenerate in order to convert electric energy to kinetic energy, and vice versa, by transmitting electric machine controls operation signals. In some examples, the controller modulates the cruise speed reference and commands the engine to turn off (and to turn on or have it in an idle state after the coasting opportunity) by transmitting engine controls operation signals. In some examples, the controller commands the transmission to disengage (and to reengage after the coasting opportunity) by transmitting transmission controls operation signals.

FIG. 3B shows the process 300 after the start of the coasting opportunity (which may also be referred to as a "coasting event"). In step 312, the controller enables regenerative braking when the engine is deactivated and disengaged, such that the energy storage device may be powered to increase its SOC in the event that the energy storage device is necessary to meet the power demand of the vehicle. In some examples, the controller also enables motor propulsion. In some examples, the regenerative braking is enabled at a location where a predicted speed increase above an upper speed threshold begins based on the lookahead information. In some examples, the motor propulsion is enabled at a location where a predicted speed decrease below a lower speed threshold begins based on the lookahead information. In step 314, the controller determines the transmission gear reference while the engine is deactivated and disengaged, as previously mentioned, which is the gear that will be used when the engine is reengaged with the transmission. In step 316, at an end of the coasting event, the engine is reactivated and is also reengaged with the transmission at the determined transmission gear reference. In step 318, the controller provides updated present state information to the memory storage device such that the old information is replaced, thereby keeping the data up-to-date to be used when the controller performs the process 300 again in the future.

FIGS. 4A through 4H show the results of simulations comparing performance of a hybrid vehicle using the presently disclosed process with that using a known process. The present process is represented by the process 300 (coordinated predictive cruise control, predictive engine-off coasting, and predictive power split between engine and electric machine), whereas the known process uses only the predictive cruise control, without the predictive engine-off coasting and the predictive power split. FIG. 4A shows a comparison between the changes in speed of the vehicle when the present process is applied (line 400) and when the known process is applied (line 402). The dashed lines 404 represent the upper and lower speed thresholds for the range of cruise control reference speed.

FIG. 4B shows the changes in the road grade during the lookahead window from 2 to 6 miles. FIG. 4C shows the difference between the present process (bold line) and the known process (thin line) regarding when the engine is turned on/off during the lookahead window. FIG. 4D shows the comparison of engine speeds for the two processes. FIG. 4E shows the battery SOC comparison for the two processes. FIG. 4F shows the difference in the fuel consumption using the present process (solid line 400) and the known process (dashed line 402). FIG. 4G shows the electric machine (motor/generator) power demand comparison for the two processes. FIG. 4H shows the engine power demand comparison for the two processes.

Specifically, in FIG. 4C, the engine is turned off in the present process 400 (bold line) at four intervals: between about 2.2 and 2.4 miles, 2.8 and 3.6 miles, 4.1 and 5.5 miles, and 5.7 and 6 miles. In comparison, the known process 402 (thin line) has numerous instances where the engine fluctuates between on and off stages, with the longest engine-off interval between about 3.2 and 3.4 miles. Not only does constantly switching the engine on and off in the known process 402 consumes more fuel, but the known process 402 does not allow the engine to be turned off for sufficient time to enable engine-off coasting. In comparison, the present process 400 enables the engine-off coasting during the aforementioned four intervals, three of which are longer than the longest interval in the know process 402 in which the engine was allowed to remain turned off.

In the present process, the engine is activated when there is an increased engine power demand, as shown in FIG. 4H, which corresponds to when the road grade shown in FIG. 4B is at a positive grade value (i.e., there is an incline on the road). Therefore, the present process 400 enables the engine to achieve an extended state of engine-off coasting (e.g., lasting longer than 0.5 miles, for example) which is not achievable using the known process 402. That is, the predictive speed reference enables the extended engine-off coasting while meeting vehicle speed constraints during uphill and downhill routes, as shown by the road grades in FIG. 4B. Additionally, the fuel consumption of the present process 400 is constantly below the known process 402 in FIG. 4F, thereby improving the fuel economy of the vehicle considerably in the span of the lookahead window. The total fuel consumption in FIG. 4F is represented by the area underneath the curve that is drawn.

Figure 5A:
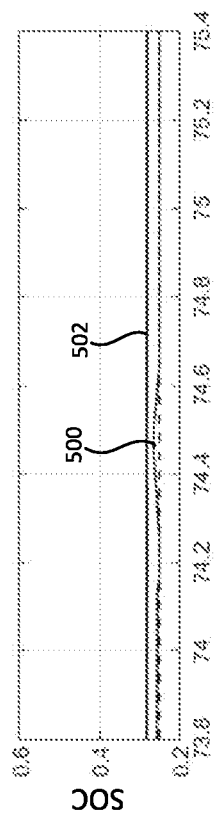
FIGS. 5A through 5H show a series of graphs comparing the results of a coordinated predictive control process according to an embodiment disclosed herein with those of a predictive cruise control process as known in the art.
Figure 5B:
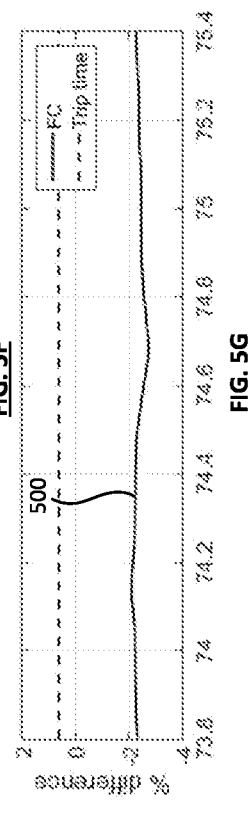
Figure 5C:
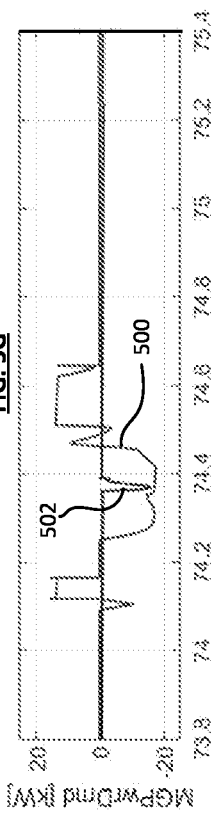
Figure 5D:
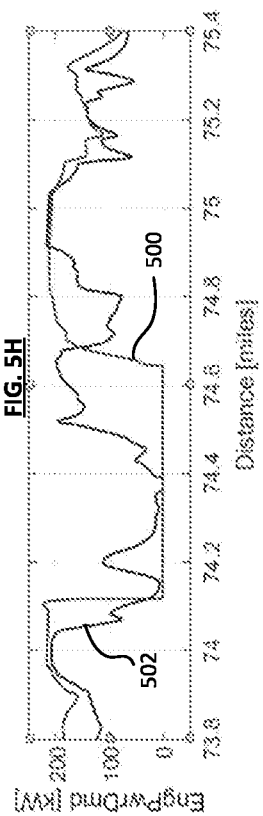
Figure 5E:
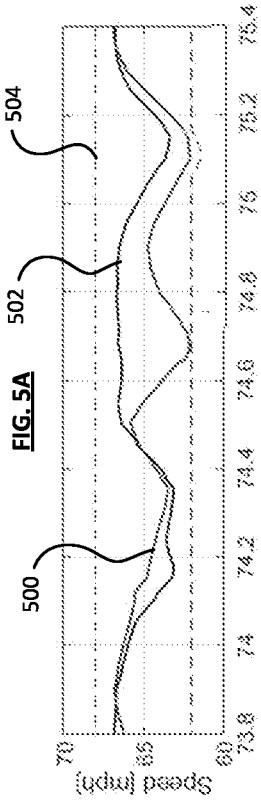
Figure 5F:
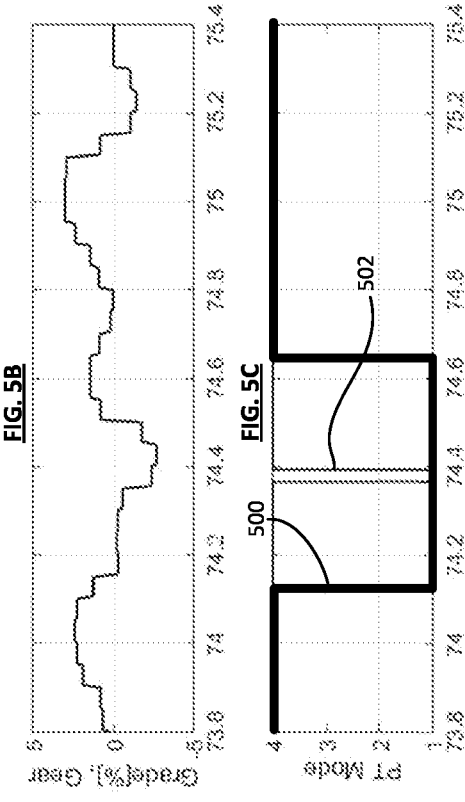
Figure 5G:
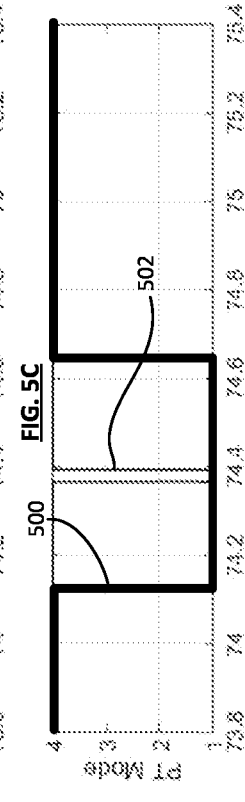
Figure 5H:
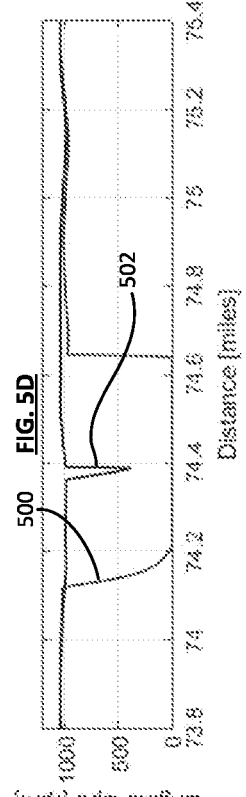

FIGS. 5A through 5H show the results of another set of simulations comparing performance of a hybrid vehicle using the present process 500 and the known process 502. Similar to FIGS. 4A through 4H, the figures show the speed comparison (FIG. 5A), road grade (FIG. 5B), engine on/off comparison (FIG. 5C), engine speed comparison (FIG. 5D), SOC comparison (FIG. 5E), fuel consumption difference (FIG. 5F), electric machine power demand comparison (FIG. 5G), and engine power demand comparison (FIG. 5H). The dashed lines 504 in FIG. 5A represent the upper and lower speed thresholds for the range of cruise control reference speed.

In this simulation, the engine is turned off during a period from 74.1 to 74.65 miles, as shown in FIG. 5C. This corresponds with the region in which the road grade has a negative value, i.e. downhill. The propulsion of electric machine and the engine-off coasting both start at a pre-downhill point around 74.1 miles, when the road grade is still positive, since the downhill event is predicted from the lookahead information. Furthermore, as shown in FIG. 5G, a downhill regenerative braking mode is activated followed by an uphill motor-generator propulsion based on the available SOC in order to prolong the engine-off coasting event.

Figure 6A:
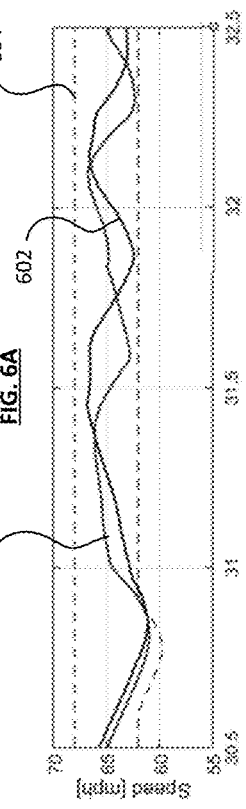
FIGS. 6A through 6H show a series of graphs comparing the results of a coordinated predictive control process according to an embodiment disclosed herein with those of a predictive cruise control process as known in the art.
Figure 6B:
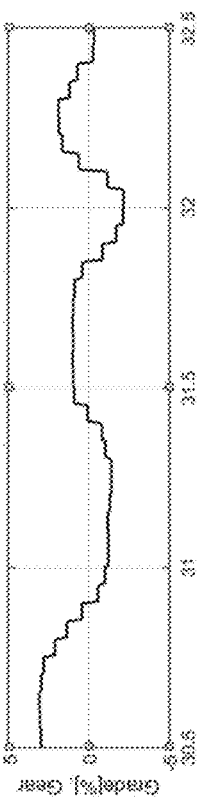
Figure 6C:
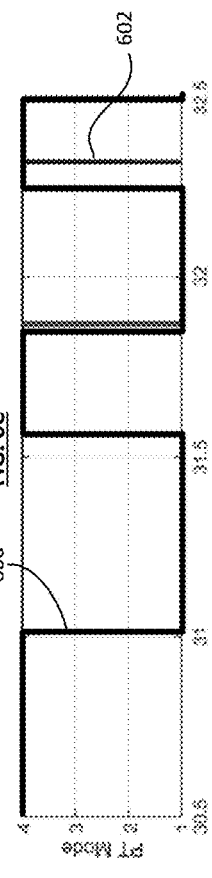
Figure 6D:
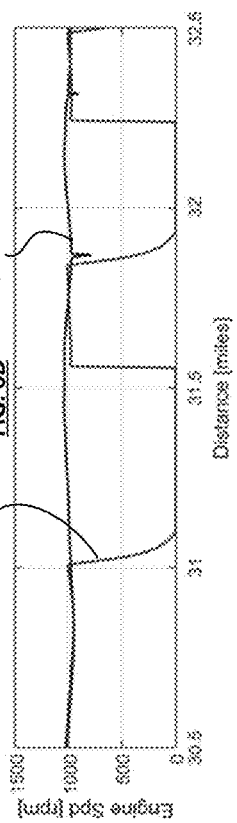
Figure 6E:
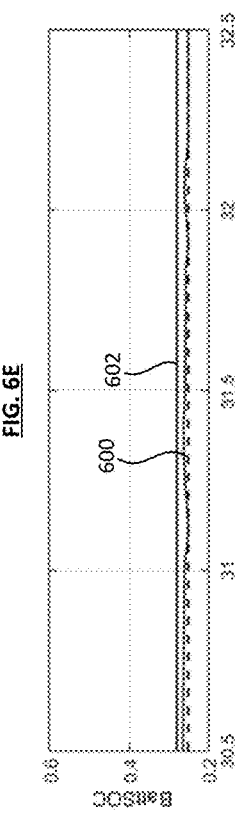
Figure 6F:
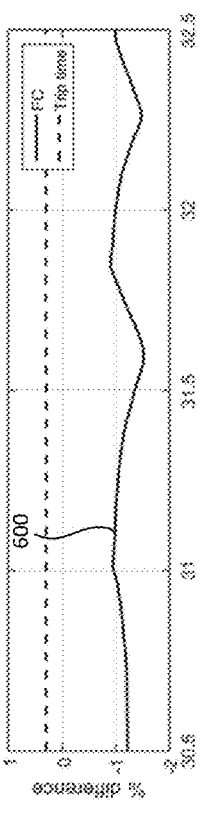
Figure 6G:
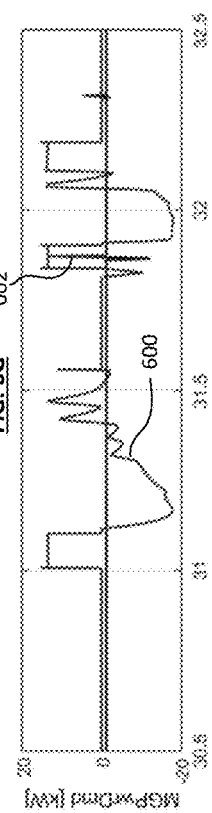
Figure 6H:
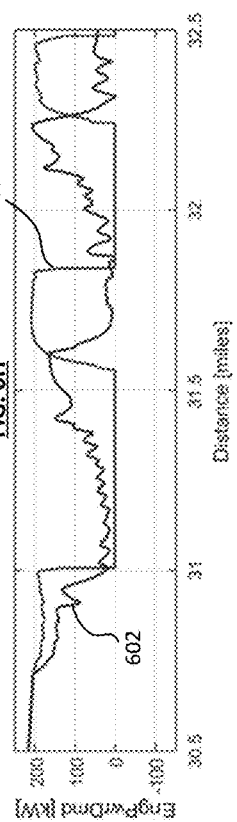

FIGS. 6A through 6H show the results of another set of simulations comparing performance of a hybrid vehicle using the present process 600 and the known process 602. Similar to FIGS. 4A through 4H, the figures show the speed comparison (FIG. 6A), road grade (FIG. 6B), engine on/off comparison (FIG. 6C), engine speed comparison (FIG. 6D), SOC comparison (FIG. 6E), fuel consumption difference (FIG. 6F), electric machine power demand comparison (FIG. 6G), and engine power demand comparison (FIG. 6H). The dashed lines 604 in FIG. 6A represent the upper and lower speed thresholds for the range of cruise control reference speed.

In this simulation, the engine is turned off twice, the first time from about 31 to 31.6 miles and the second time from about 31.8 to 32.3 miles, as shown in FIG. 6C. In this situation, as shown in FIG. 5G, there is a motor-generator propulsion from a point of about 31 to 31.1 miles when the motor-generator power demand increases during the first engine-off coasting event. This is followed by a regenerative braking when the motor-generator experiences negative power demand from about 31.1 to 31.4 miles. This is followed by another motor-generator propulsion from about 31.8 to 31.9 miles, during the second engine-off coasting event.

FIG. 7 shows another example of flowchart for a presently disclosed process 700 to optimize predictive cruise control and predictive power split between the engine and the electric machine for a variety of objectives, including but not limited to fuel economy, vehicle performance, emissions, and component life. The vehicle has a parallel hybrid architecture and has the ability to disengage the engine from the driveline while keeping the electrical machine engaged to provide power as necessary. The process 700 is performed by the controller 118, or in some examples more specifically the powertrain supervisor module 200 of the processing unit 120 within the controller 118. In step 702, the controller queries for and receives lookahead information, as previously mentioned, within a lookahead window. In step 704, the controller receives the present state information of the vehicle, also previously mentioned. The controller may receive information from any source including but not limited to local memory storage device, remote memory storage device, or other devices such as portable devices or computers electrically coupled with the vehicle.

In step 706, the controller determines, based on the lookahead information and the present state information, a cruise control reference speed and a power split between the engine and the electric machine during the lookahead window. Specifically, the controller modulates the cruise control reference speed and the power split in order to optimize vehicle metrics of interest. For example, the controller determines the power split and the cruise control reference speed by trading off the vehicle's kinetic energy and electric energy in a way that optimizes both the system energy loss (for example, engine or service braking modes) and the powertrain efficiency, while meeting the performance constraints.

In some examples, the controller also proceeds to step 708 to enable regenerative braking within the lookahead window and/or step 710 to enable the engine to charge the battery SOC at low vehicle speed. Steps 708 and 710 are interchangeable. In some examples, the controller also enables motor propulsion. In some examples, the regenerative braking is enabled at a location where a predicted speed increase above an upper speed threshold begins based on the lookahead information. In some examples, the motor propulsion is enabled at a location where a predicted speed decrease below a lower speed threshold begins based on the lookahead information. In some examples, the controller employs cruise control reference speed to create a vehicle speed slowdown event based on the lookahead information such as lookahead power demands and optimization constrains. Doing so charges the battery SOC through power split, and the electric machine is subsequently employed to assist the engine in providing traction torque for the vehicle when the controller deems it optimal for engine operating efficiency. In some examples, for performance optimization at areas of high power demands, the controller employs the engine to charge the battery SOC when the vehicle is slowed down. Doing so saves the SOC of the battery to be later used by the electric machine to propel the vehicle along with the engine at areas with high power demand. Therefore, the power split may be determined based on how the lookahead power demands and optimization constrains, such that the engine may assist the electric machine in some situations whereas the electric machine may assist the engine in other situations. Examples of such situations are illustrated in subsequent figures as explained herein.

Figure 8A:
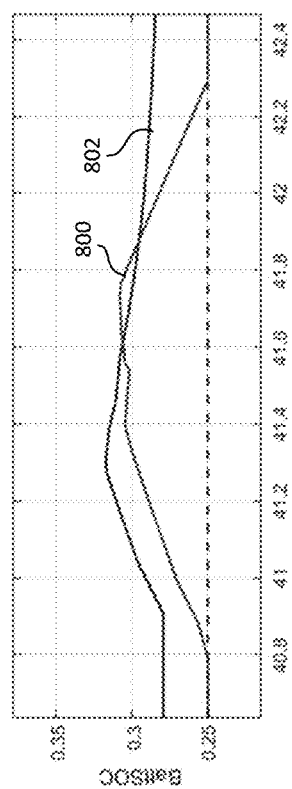
FIGS. 8A through 8F show a series of graphs comparing the results of a coordinated predictive control process according to an embodiment disclosed herein with those of a predictive cruise control process as known in the art.
Figure 8B:
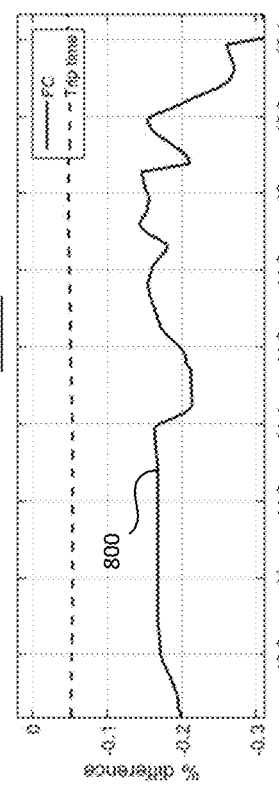
Figure 8C:
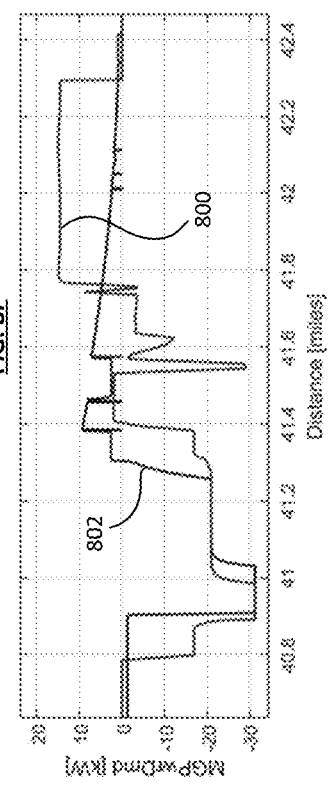
Figure 8D:
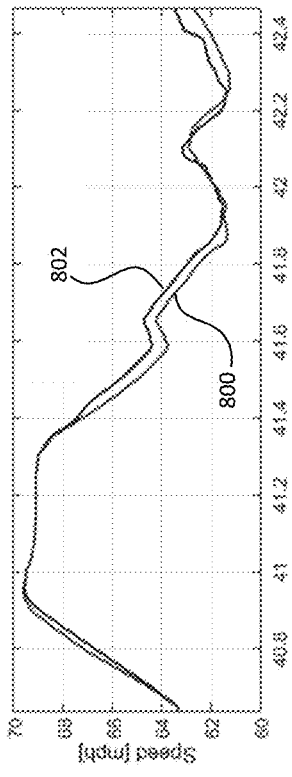
Figure 8E:
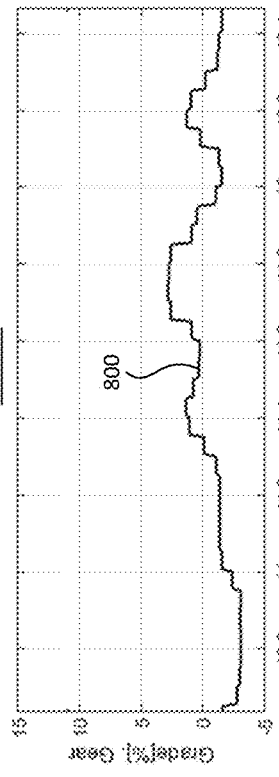
Figure 8F:
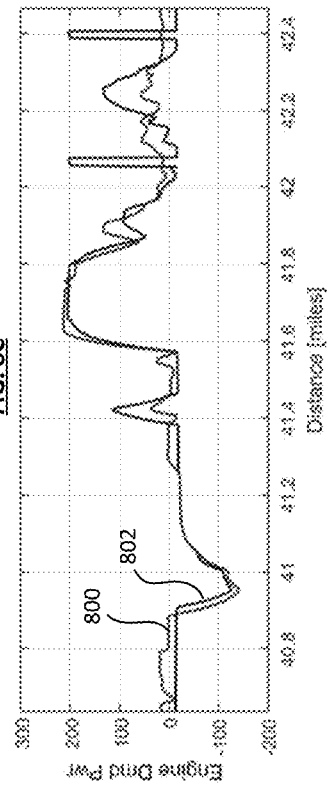

FIGS. 8A through 8F show the results of a set of simulations comparing performance of a hybrid vehicle using the present process 800 and the known process 802. The present process 800 is characterized by the coordinated predictive cruise control and predictive power split, whereas the known process 802 pertains to using only the predictive cruise control and a predetermined power split that is not coordinated with the cruise control. The figures show the speed comparison (FIG. 8A), road grade (FIG. 8B), engine power demand comparison (FIG. 8C), SOC comparison (FIG. 8D), fuel consumption difference (FIG. 8E), and electric machine power demand comparison (FIG. 8F).

The present process 800 is explained herein. In the present process 800, the engine charges the battery SOC while increasing speed on a decline from about 40.6 to 40.9 miles. As shown in FIGS. 8B and 8C, during this span of distance, there is positive engine power demand while the road grade remains negative. In FIG. 8C, the engine power demand increases significantly during the distance of between about 41.6 miles to 41.8 miles, after which the engine power demand decreases. On the other hand, in FIG. 8F, the electric machine power demand increases from the span of distance from about 41.8 miles to 42.3 miles, which is after the engine power demand begins decreasing. In this regard, the electric machine is assisting the engine to provide additional torque by conserving the battery SOC during the trip until about 41.8 miles, as shown in FIG. 8D, at which point the battery SOC is being used by the electric machine to provide additional torque in order to meet the high power demand required for the vehicle at that part of the trip. In some examples, the controller determines the cruise control reference speed and the power split to conserve the battery SOC until the power demand for the hybrid vehicle exceeds a power demand threshold. Doing so significantly reduces the fuel consumption of the engine, as shown in FIG. 8E, thereby optimizing engine efficiency.

Figure 9D:
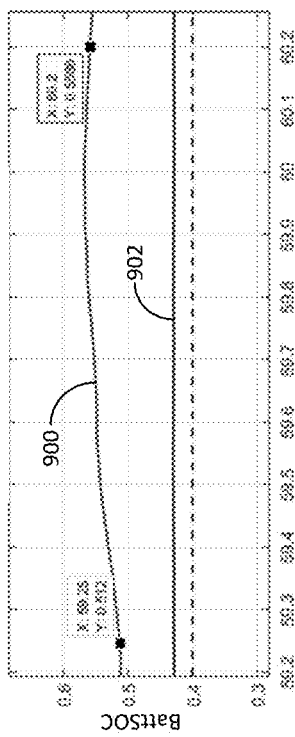
FIGS. 9A through 9F show a series of graphs comparing the results of a coordinated predictive control process according to an embodiment disclosed herein with those of a predictive cruise control process as known in the art.
Figure 9E:
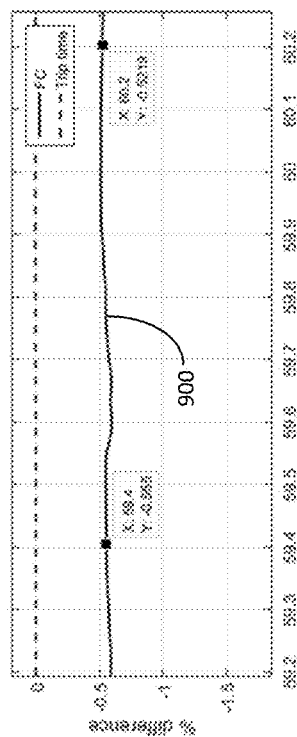
Figure 9F:
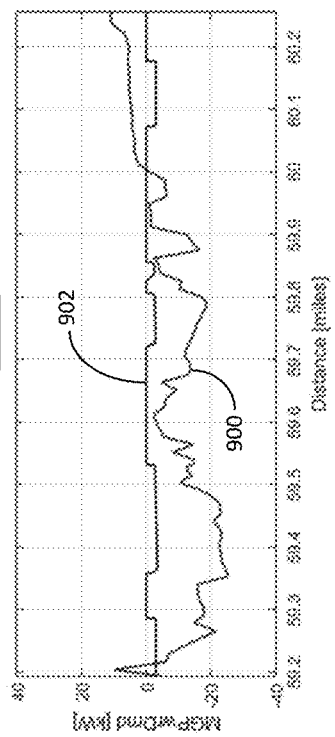
Figure 9A:
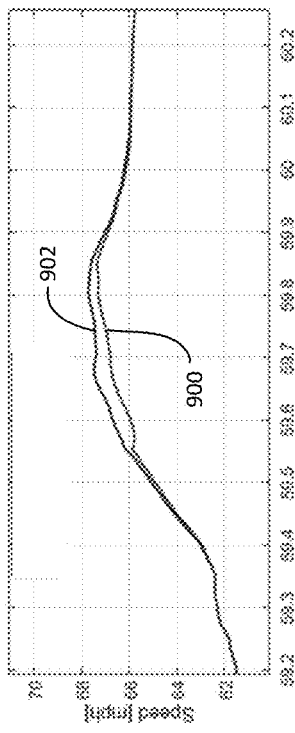
Figure 9B:
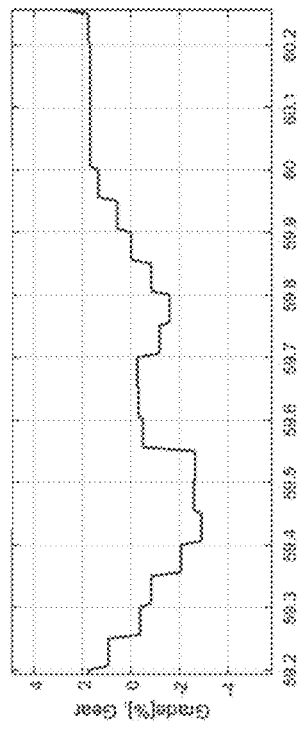
Figure 9C:
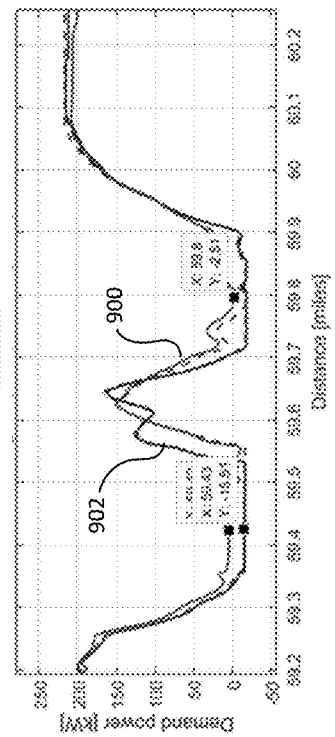

FIGS. 9A through 9F show the results of another set of simulations comparing performance of a hybrid vehicle using the present process 900 and the known process 902. The present process 900 uses engine assisted electric motor regeneration on downhills and pre-downhills (distance shortly before a downhill event). The figures show the speed comparison (FIG. 9A), road grade (FIG. 9B), engine power demand comparison (FIG. 9C), SOC comparison (FIG. 9D), fuel consumption difference (FIG. 9E), and electric machine power demand comparison (FIG. 9F).

In the known process 902, when the drive demand is negative and the battery SOC is not saturated, the electric machine is allowed to initiate regenerative braking. The engine compensates for the difference in driver demand, even resulting in positive engine work, and may result in lowering speed increases. In comparison, with the present process 900, when the predicted vehicle speed is sufficiently higher than the cruise control reference speed, the electric machine initiates regenerative braking at locations where vehicle speed is predicted to begin increasing, as determined based on the lookahead information. Specifically, the predictive cruise control impacts the speed prediction at pre-downhills, and the electric machine can initiate regenerative braking at pre-downhills. The difference between (a) applying the engine-off coasting or neutral coasting with regenerative braking enabled for the electric machine and (b) an engine-assisted regenerative braking for the electric machine, is found in its impact on the speed predictions. As a result, the present process 900 causes decrease in the fuel consumption compared to the known process 902.

Figure 10A:
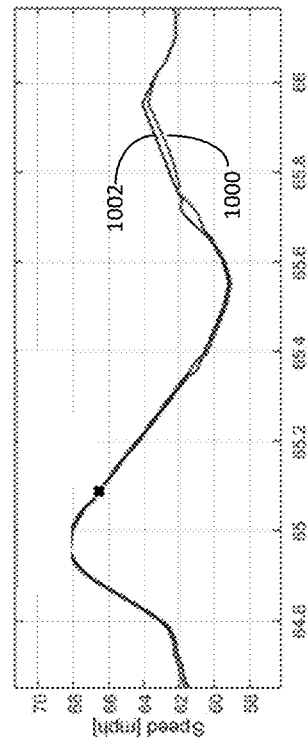
FIGS. 10A through 10F show a series of graphs comparing the results of a coordinated predictive control process according to an embodiment disclosed herein with those of a predictive cruise control process as known in the art.
Figure 10B:
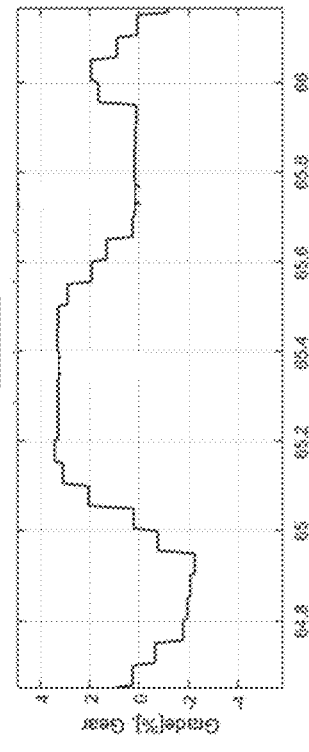
Figure 10C:
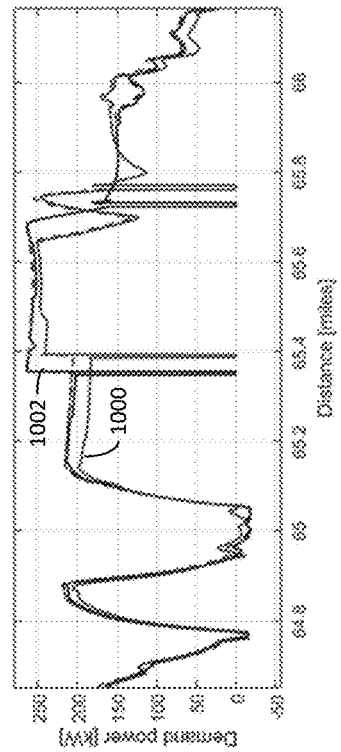
Figure 10D:
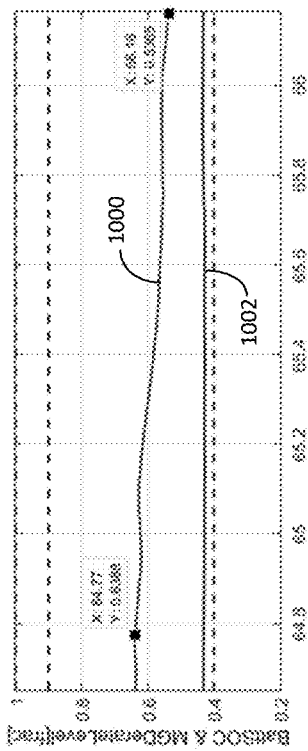
Figure 10E:
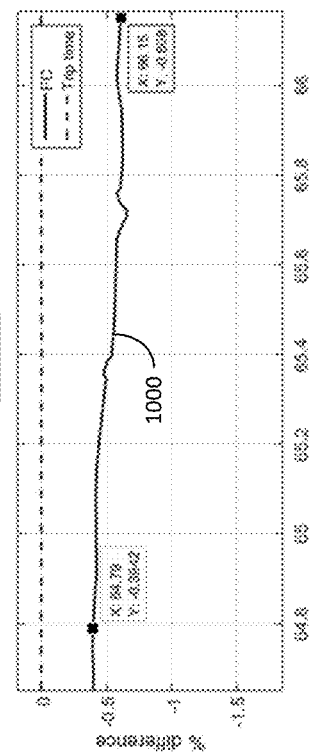
Figure 10F:
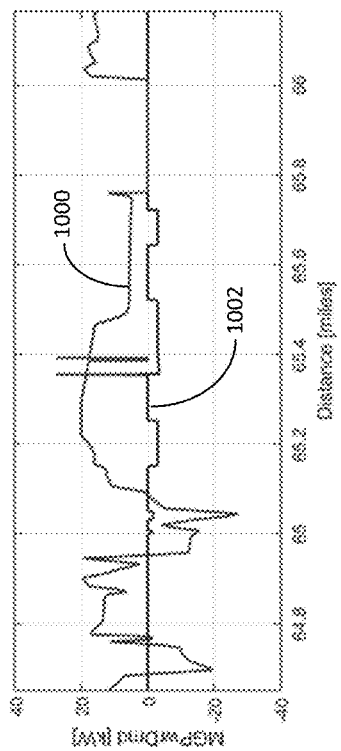

FIGS. 10A through 10F show the results of another set of simulations comparing performance of a hybrid vehicle using the present process 1000 and the known process 1002. The present process 1000 uses electric machine to assist the engine on uphills and pre-uphills (distance shortly before an uphill event). The figures show the speed comparison (FIG. 10A), road grade (FIG. 10B), engine power demand comparison (FIG. 10C), SOC comparison (FIG. 10D), fuel consumption difference (FIG. 10E), and electric machine power demand comparison (FIG. 10F).

In the known process 1002, when the driver demand is positive and battery SOC is available, the electric machine assists the engine in providing power to meet the power demand. In comparison, with the present process 1000, the electric machine conserves battery SOC. When the predicted vehicle speed is sufficiently lower than the cruise control reference speed, the electric machine assists the engine at a location close to where a speed increase is predicted to start, based on the lookahead information. For example, the pre-uphill speed up starts at the distance of about 64.8 miles (see FIG. 10C), which is about 0.2 miles from when the road grade becomes positive at about 65 miles (see FIG. 10B). When the battery SOC is close to the minimum value that is allowed, the lookahead knowledge is utilized to reduce the frequent switching between charging and discharging of the battery. The predictive cruise control impacts the speed prediction on pre-uphills, and the electric machine also assists in pre-uphills. As a result, the fuel consumption decreases in the present process 1000 compared to the known process 1002, and the combination of the engine-assisted electric machine regeneration and the electric machine assistance for the engine altogether improve the engine's brake thermal efficiency (BTE).

FIGS. 11A through 11D show the results of another set of simulations comparing performance of a hybrid vehicle using the present process 1100 and the known process 1102. The present process 1100 uses the engine to assist electric machine regeneration followed by the electric machine assisting the engine in providing torque to meet the power demand. The figures show the speed comparison, road grade, and engine power demand comparison (FIG. 11A), as well as SOC comparison (FIG. 11B), fuel consumption difference (FIG. 11C), and electric machine power demand comparison (FIG. 11D).

FIG. 11A shows two zones: a first zone 1104 and a second zone 1106. The first zone 1104 indicates when the engine is assisting the electric machine regeneration, and the second zone 1106 indicates when the electric machine is assisting the engine in return. The engine demand power is shown to increase until the point at about 12.3 miles, which is shortly before the road grade becomes negative, indicating a downhill region, at around 12.4 miles. The additional power provided by the engine helps the regenerative braking initiated by the electric machine and allows for the battery SOC to be charged more efficiently thereafter. Then, at the start of the second zone 1106, the road grade becomes positive, indicating an uphill region, at around 13.8 miles. The positive road grade indicates an increase in the power demand, which is met by increasing not only the engine power demand but also the electric machine power demand as shown in FIG. 11D. Doing so allows for the vehicle to operate such that each component assists each other in the appropriate situations.

Figure 12A:
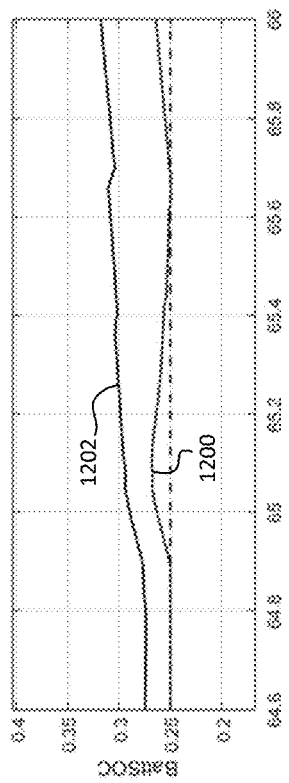
FIGS. 12A through 12F show a series of graphs comparing the results of a coordinated predictive control process according to an embodiment disclosed herein with those of a predictive cruise control process as known in the art.
Figure 12B:
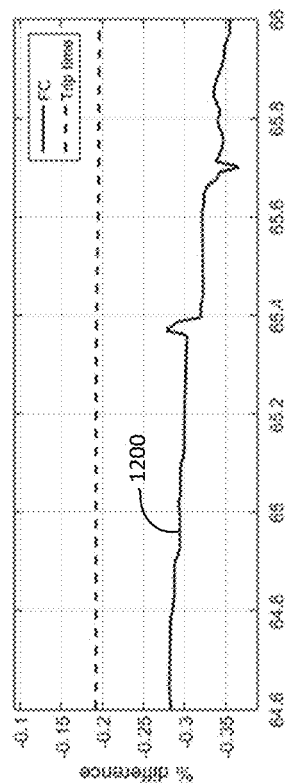
Figure 12C:
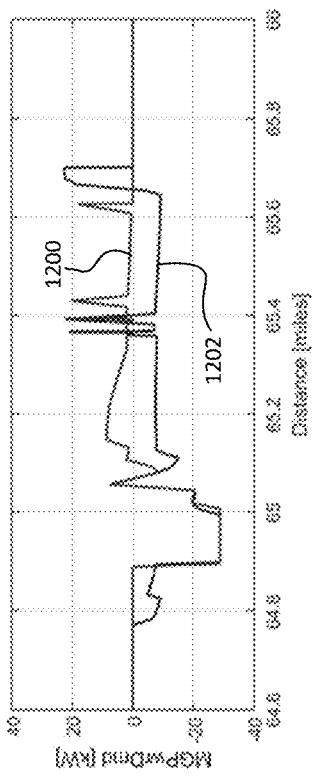
Figure 12D:
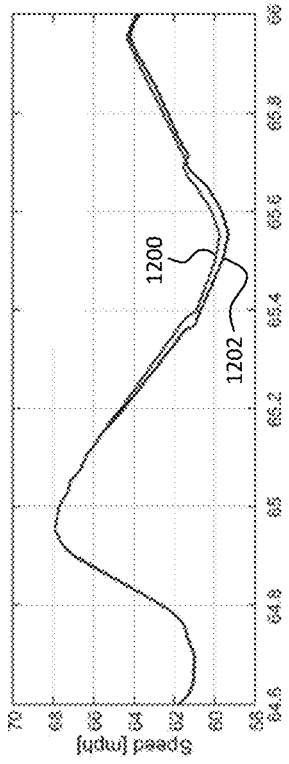
Figure 12E:
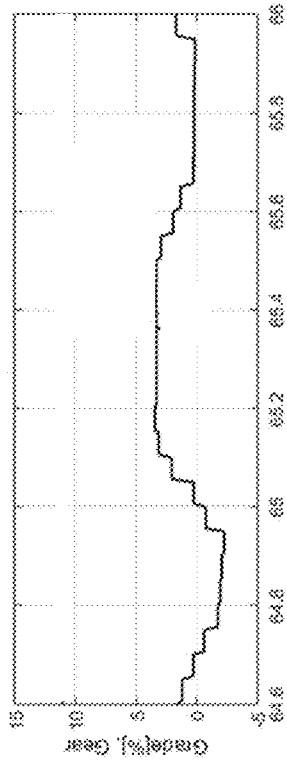
Figure 12F:
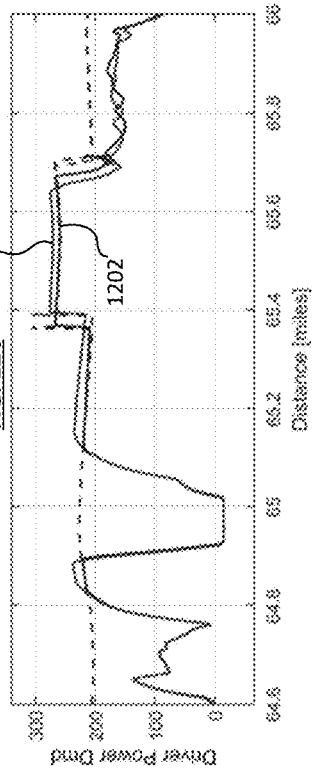

FIGS. 12A through 12F show the results of another set of simulations comparing performance of a hybrid vehicle using the present process 1200 and the known process 1202. The present process 1200 uses power from the electric machine to augment power of the engine. The figures show the speed comparison (FIG. 12A), road grade (FIG. 12B), engine power demand comparison (FIG. 12C), SOC comparison (FIG. 12D), fuel consumption difference (FIG. 12E), and electric machine power demand comparison (FIG. 12F).

In the present process 1200, the battery SOC is conserved to subsequently combine the power capability of the engine with the power capability of the electric machine, in order to reduce the "lugging" experienced by the vehicle when there is limited engine power. Lugging is experienced when the vehicle is traveling uphill for a prolonged distance, as shown in FIG. 12B, where the road grade remains positive during the span of from about 65 miles to 65.7 miles. As shown in FIG. 12A, the vehicle speed reaches below 60 mph speed threshold because the engine power demand is capped at about 260 kW, as shown in FIG. 12C. In the known process 1202, the speed is allowed to be reduced to below the 60 mph speed threshold, since the engine is incapable of providing more power to meet the demand. However, in the present process 1200, the electric machine which had been conserving battery SOC until this point is capable of providing the additional power needed to meet the power demand and thus reducing the amount of the vehicle lugging to below the cruise control reference speed during the uphill event.

Figure 13:
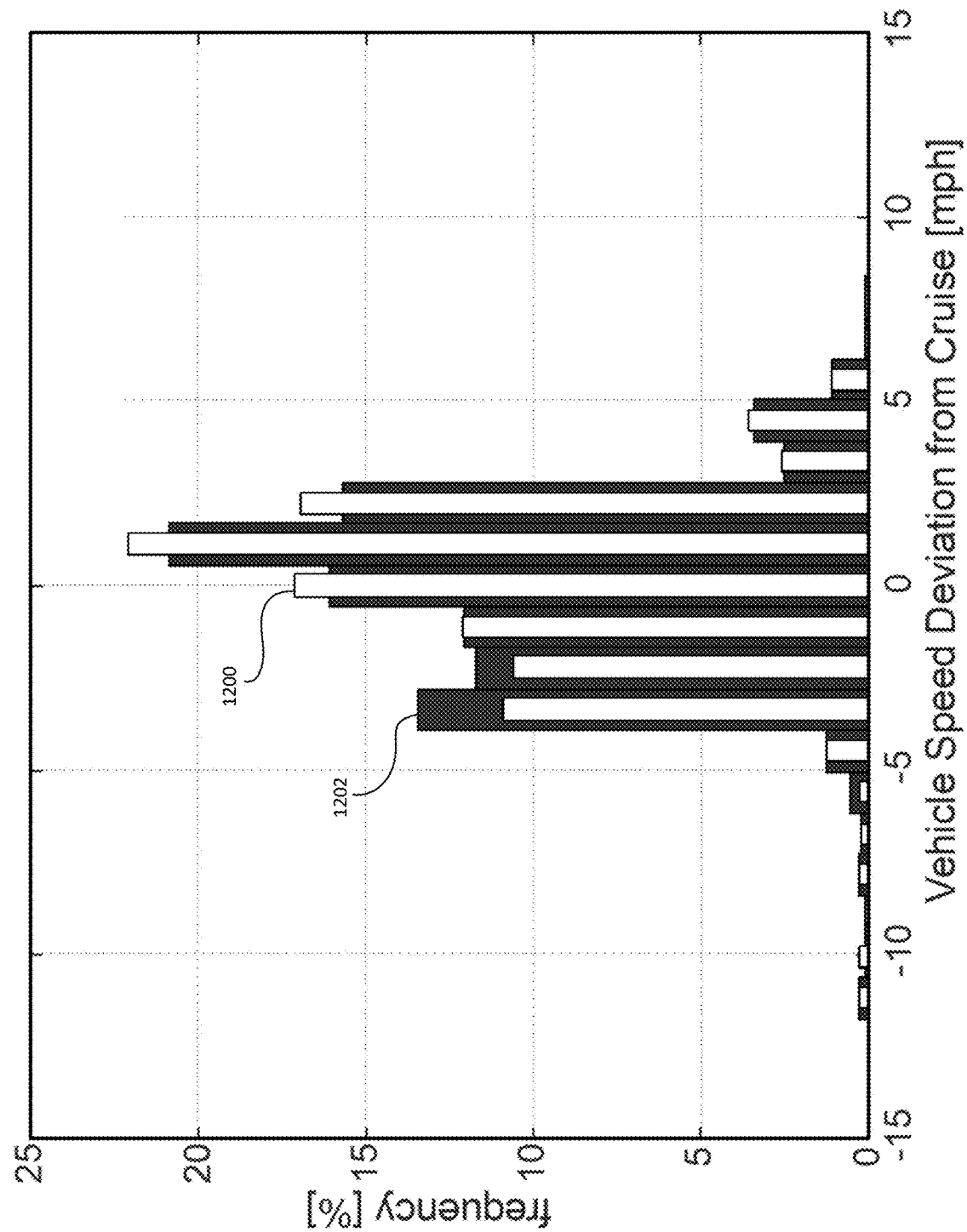
FIG. 13 shows a graph comparing percentage frequencies of vehicle speed deviation from cruise control speed for a coordinated predictive control process according to an embodiment disclosed herein with those of a predictive cruise control process as known in the art.

FIG. 13 shows a difference between the present process 1200 (white bars) and the known process 1202 (dark bars) from FIGS. 12A through 12F in terms of the amount of vehicle speed deviation from the cruise control reference speed. The greatest differences are observed at the −4 mph and −3 mph deviation points from cruise control reference speed. The known process 1202 measures 13% frequency (as compared to the 11% frequency for the present process 1200) that the vehicle lugged to 4 mph below the cruise speed, and 12% frequency (as compared to the 10% frequency for the present process 1200), which clearly shows that the known process 1202 lugs more frequently than the present process 1200.

Although the examples and embodiments have been described in detail with reference to certain preferred embodiments, variations and modifications exist within the spirit and scope of the disclosure as described and defined in the following claims.

What is claimed is:

1. A hybrid vehicle comprising:
an engine;
a drivetrain mechanically coupled with the engine, comprising a clutch and a transmission;
an electric machine mechanically coupled with the transmission;
an energy storage device coupled with the electric machine; and
a controller operatively coupled with the engine, the drivetrain, and the electric machine, the controller configured to:
receive lookahead information within a lookahead window;
receive present state information of the hybrid vehicle;
determine, during the lookahead window based on the lookahead information and the present state information, a predicted coasting opportunity exceeding a predetermined threshold;
determine a cruise control reference speed, a power split between the engine and the electric machine, and a timing of enabling engine-off coasting during the predicted coasting opportunity;
deactivate the engine and disengage the clutch at a start of the predicted coasting opportunity in response to enabling the engine-off coasting;
activate the electric machine to facilitate regenerative braking to charge the energy storage device when the engine is deactivated; and
operate the engine during a portion of the lookahead window to provide additional power to increase a speed of the vehicle when a power demand for the vehicle decreases, such that the additional power provided by the engine assists in charging the energy storage device via the regenerative braking before the power demand increases.

2. The hybrid vehicle of claim 1, wherein the controller is further configured to:
determine a transmission gear reference while the engine is deactivated; and
reengage the engine at the determined transmission gear reference when the engine is reactivated.

3. The hybrid vehicle of claim 1, wherein the controller is further configured to provide updated present state information to a memory storage device.

4. The hybrid vehicle of claim 1, wherein the lookahead information includes at least one of: road grade and terrain information, speed limits, traffic information, stop signs, traffic signals, or weather conditions.

5. The hybrid vehicle of claim 1, wherein the predetermined threshold is defined by an extended distance of at least 0.3 mile during which the engine can be deactivated.

6. The hybrid vehicle of claim 5, wherein the extended distance is at least 0.5 mile.

7. The hybrid vehicle of claim 5, wherein the extended distance is at least 1 mile.

8. The hybrid vehicle of claim 1, wherein the lookahead information is provided from a remote device wirelessly coupled with the controller via a cloud network infrastructure.

9. A hybrid vehicle comprising:
an engine;
a drivetrain mechanically coupled with the engine, comprising a clutch and a transmission;
an electric machine mechanically coupled with the transmission;
an energy storage device coupled with the electric machine; and
a controller operatively coupled with the engine, the drivetrain, and the electric machine, the controller configured to:
receive lookahead information within a lookahead window;
receive present state information of the hybrid vehicle;
determine a cruise control reference speed and a power split between the engine and the electric machine during the lookahead window based on the lookahead information and the present state information;
activate the electric machine to facilitate motor propulsion and regenerative braking to charge the energy storage device within the lookahead window; and
operate the engine during a portion of the lookahead window to provide additional power to increase a speed of the vehicle when a power demand for the vehicle decreases, such that the additional power provided by the engine assists in charging the energy storage device via the regenerative braking before the power demand increases.

10. The hybrid vehicle of claim 9, wherein the regenerative braking is enabled at a location where a predicted speed increase above an upper speed threshold begins based on the lookahead information.

11. The hybrid vehicle of claim 9, wherein the motor propulsion is enabled at a location where a predicted speed decrease below a lower speed threshold begins based on the lookahead information.

12. The hybrid vehicle of claim 9, wherein the controller is further configured to enable the engine to charge the energy storage device coupled with the electric machine when speed of the vehicle is below a lower speed threshold.

13. The hybrid vehicle of claim 9, wherein the controller determines the cruise control reference speed and the power split to conserve a state of charge (SOC) of the energy storage device coupled with the electric machine until the power demand for the hybrid vehicle exceeds a power demand threshold.

14. The hybrid vehicle of claim 9, wherein the lookahead information includes at least one of: road grade and terrain information, speed limits, traffic information, stop signs, traffic signals, or weather conditions.

15. The hybrid vehicle of claim 14, wherein the lookahead information is provided from a remote device wirelessly coupled with the controller via a cloud network infrastructure.

16. A method of controlling a hybrid vehicle, the hybrid vehicle comprising an engine, a drivetrain mechanically coupled with the engine and comprising a clutch and a transmission, and an electric machine mechanically coupled with the transmission, the method comprising:
   receiving, by a control module, lookahead information within a lookahead window;
   receiving, by the control module, present state information of the hybrid vehicle;
   determining, by the control module during the lookahead window based on the lookahead information and the present state information, a predicted coasting opportunity exceeding a predetermined threshold; and
   determining, by the control module, a cruise control reference speed, a power split between the engine and the electric machine, and a timing of enabling engine-off coasting during the predicted coasting opportunity;
   deactivating, by the control module, the engine and disengaging the clutch at a start of the predicted coasting opportunity in response to enabling the engine-off coasting;
   activating, by the control module, the electric machine to facilitate regenerative braking to charge an energy storage device coupled with the electric machine when the engine is deactivated; and
   operating, by the control module, the engine during a portion of the lookahead window to provide additional power to increase a speed of the vehicle when a power demand for the vehicle decreases, such that the additional power provided by the engine assists in charging the energy storage device via the regenerative braking before the power demand increases.

17. The method of claim 16, further comprising: enabling motor propulsion at a location where a predicted speed decrease below a lower speed threshold begins based on the lookahead information.

18. The method of claim 16, further comprising:
   determining a transmission gear reference while the engine is deactivated; and
   reengaging the engine at the determined transmission gear reference when the engine is reactivated.

19. The method of claim 16, wherein the lookahead information includes at least one of: road grade and terrain information, speed limits, traffic information, stop signs, traffic signals, or weather conditions.

20. The method of claim 16, wherein the predetermined threshold is defined by an extended distance of at least 0.3 mile during which the engine can be deactivated.

21. A method of controlling a hybrid vehicle, the hybrid vehicle comprising an engine, a drivetrain mechanically coupled with the engine and comprising a clutch and a transmission, and an electric machine mechanically coupled with the transmission, the method comprising:
   receiving, by a control module, lookahead information within a lookahead window;
   receiving, by the control module, present state information of the hybrid vehicle;
   determining, by the control module, a cruise control reference speed and a power split between the engine and the electric machine during the lookahead window based on the lookahead information and the present state information;
   activating, by the control module, the electric machine to facilitate motor propulsion and regenerative braking to charge an energy storage device coupled with the electric machine within the lookahead window based on the cruise control reference speed and the power split; and
   operating, by the control module, the engine during a portion of the lookahead window to provide additional power to increase a speed of the vehicle when a power demand for the vehicle decreases, such that the additional power provided by the engine assists in charging the energy storage device via the regenerative braking before the power demand increases.

22. The method of claim 21, wherein the motor propulsion is enabled at a location where a predicted speed decrease below a lower speed threshold begins based on the lookahead information.

23. The method of claim 21, wherein the regenerative braking is enabled at a location where a predicted speed increase above an upper speed threshold begins based on the lookahead information.

24. The method of claim 21, further comprising: enabling, by the control module, the engine to charge the energy storage device coupled with the electric machine when speed of the vehicle is below a lower speed threshold.

25. The method of claim 21, further comprising: determining, by the control module, the cruise control reference speed and the power split to conserve a state of charge (SOC) of the energy storage device coupled with the electric machine until the power demand for the hybrid vehicle exceeds a power demand threshold.

26. The method of claim 21, wherein the lookahead information includes at least one of: road grade and terrain information, speed limits, traffic information, stop signs, traffic signals, or weather conditions.

* * * * *